United States Patent
Kato et al.

(10) Patent No.: US 12,509,579 B2
(45) Date of Patent: Dec. 30, 2025

(54) THERMOPLASTIC RESIN AND OPTICAL LENS INCLUDING SAME

(71) Applicant: MITSUBISHI GAS CHEMICAL COMPANY, INC., Tokyo (JP)

(72) Inventors: Noriyuki Kato, Tokyo (JP); Shinya Ikeda, Niigata (JP); Atsushi Motegi, Tokyo (JP); Tatsunobu Ogata, Tokyo (JP); Yutaro Harada, Tokyo (JP); Katsushi Nishimori, Tokyo (JP); Kentaro Ishihara, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 489 days.

(21) Appl. No.: 18/033,163

(22) PCT Filed: Oct. 25, 2021

(86) PCT No.: PCT/JP2021/039216
§ 371 (c)(1),
(2) Date: Apr. 21, 2023

(87) PCT Pub. No.: WO2022/091996
PCT Pub. Date: May 5, 2022

(65) Prior Publication Data
US 2023/0399510 A1 Dec. 14, 2023

(30) Foreign Application Priority Data
Oct. 27, 2020 (JP) .................... 2020-179301

(51) Int. Cl.
*C08L 69/00* (2006.01)
*C08G 64/16* (2006.01)
*G02B 1/04* (2006.01)

(52) U.S. Cl.
CPC ........ *C08L 69/005* (2013.01); *C08G 64/1608* (2013.01); *G02B 1/041* (2013.01); *C08L 2203/16* (2013.01)

(58) Field of Classification Search
None
See application file for complete search history.

(56) References Cited

U.S. PATENT DOCUMENTS

| 2006/0057494 | A1  | 3/2006 | Lee et al. |
| 2014/0114044 | A1* | 4/2014 | Shigematsu ........... C08G 64/06 528/139 |
| 2018/0307052 | A1* | 10/2018 | Kato ........... C08G 64/16 |
| 2019/0055351 | A1  | 2/2019 | Kato et al. |
| 2019/0256524 | A1  | 8/2019 | Sato et al. |
| 2021/0054143 | A1  | 2/2021 | Shiratake et al. |

FOREIGN PATENT DOCUMENTS

| JP | 2006-83172 A | 3/2006 |
| JP | 2018-2893 A | 1/2018 |
| JP | 2018-2894 A | 1/2018 |
| JP | 2018-2895 A | 1/2018 |
| JP | 2018-59074 A | 4/2018 |
| JP | 2018-199764 A | 12/2018 |
| WO | 2017/078073 A1 | 11/2017 |
| WO | 2018/074305 A1 | 4/2018 |
| WO | 2019/188114 A1 | 10/2019 |

OTHER PUBLICATIONS

Lingier et al., "Rigid Polyurethanes, Polyesters, and Polycarbonates from Renewable Ketal Monomers", Macromolecules, Jul. 11, 2017, pp. 5346-5352.
Bonjour et al., "Rigid biobased polycarbonates with good processability based on a spirocyclic diol derived from citric acid", Green Chemistry, May 28, 2020, pp. 3940-3951.
Hufendiek et al., "Thermoplastic polyacetals: chemistry from the past for a sustainable future?", Polymer Chemistry, Oct. 9, 2018, pp. 9-33.
International Search Report issued in International Bureau of WIPO Patent Application No. PCT/JP2021/039216, dated Nov. 30, 2021, along with an English translation thereof.
Written Opinion issued in International Bureau of WIPOo Patent Application No. PCT/JP2021/039216, dated Nov. 30, 2021, along with an English translation thereof.

* cited by examiner

*Primary Examiner* — Robert S Jones, Jr.
*Assistant Examiner* — Lily K Sloan
(74) *Attorney, Agent, or Firm* — GREENBLUM & BERNSTEIN, P.L.C.

(57) ABSTRACT

A thermoplastic resin including a constituent unit (A) derived from a monomer represented by general formula (1). In general formula (1), $R_1$ and $R_{11}$ each independently represent a hydrogen atom, an aryl group having 6-12 carbon atoms, or a linear or branched alkyl group having 1-4 carbon atoms, and X represents one of general formulas (a) to (d). In general formulas (a) to (d), $R_{21}$ to $R_{57}$ each independently represent a hydrogen atom, a fluorine atom, a chlorine atom, a bromine atom, a linear or branched alkyl group having 1-4 carbon atoms, or a linear or branched alkoxy group having 1-7 carbon atoms.

18 Claims, No Drawings

THERMOPLASTIC RESIN AND OPTICAL LENS INCLUDING SAME

TECHNICAL FIELD

The present invention relates to a thermoplastic resin and an optical lens containing the same. More particularly, the present invention relates to a polycarbonate or polyester carbonate resin and an optical lens containing the same.

BACKGROUND ART

Optical glasses or optical resins are used as materials for optical lenses used in the optical systems of various cameras, including cameras, film-integrated cameras, and video cameras. Although optical glasses are excellent in heat resistance, transparency, dimensional stability, and chemical resistance, they have the problems of high material cost, poor molding formability, and low productivity.

On the other hand, optical lenses made of optical resins are advantageous in that they can be mass-produced by injection molding, and thus polycarbonate, polyester carbonate, polyester, and other resins are used as high-refractive index materials for camera lenses.

When optical resins are used as optical lenses, heat resistance, transparency, low water absorption, chemical resistance, low birefringence, moist heat resistance, and the like are required in addition to optical properties including refractive index and Abbe number. There is a demand, especially in recent years, for optical lenses having a high refractive index and high heat resistance, and thus various resins have been developed (Patent literature 1-5).

Meanwhile, resins with abundant aliphatic component have been awaited due to environmental considerations in every fields including optical resins. However, aliphatic resins generally have a lower glass transition temperature than aromatic resins and thus have problems in terms of heat resistance. Therefore, it has been desired to develop a resin with abundant aliphatic component, which has a higher glass transition temperature and better heat resistance than conventional aliphatic resins while maintaining excellent optical properties.

PRIOR ART LITERATURE

Patent Literature

Patent literature 1: Japanese Unexamined Patent Application Publication No. 2018-2893
Patent literature 2: Japanese Unexamined Patent Application Publication No. 2018-2894
Patent literature 3: Japanese Unexamined Patent Application Publication No. 2018-2895
Patent literature 4: Japanese Unexamined Patent Application Publication No. 2018-59074
Patent literature 5: WO2017/078073

SUMMARY OF INVENTION

Problem to be Solved by the Invention

The objective of the present invention is to provide a resin with abundant aliphatic component, which has excellent optical properties including refractive index and Abbe number and which also has excellent heat resistance, and to provide an optical lens using the same.

Means for Solving the Problem

The present inventors have intensively studied to solve the conventional problems and found that an aliphatic monomer having a specific structure can be used as a raw material to obtain a resin with abundant aliphatic component, which has excellent optical properties including refractive index and Abbe number and which also has excellent heat resistance, thereby accomplishing the present invention.

Thus, the present invention includes the following aspects.

<1> A thermoplastic resin comprising a structural unit (A) derived from a monomer represented by General formula (1) below:

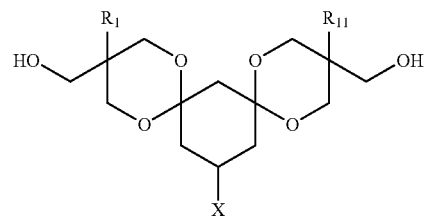

(1)

(in General formula (1), $R_1$ and $R_{11}$ each independently represent a hydrogen atom, an aryl group with 6-12 carbon atoms, or a linear or branched alkyl group with 1-4 carbon atoms, and X represents any of General formulas (a) to (d) below):

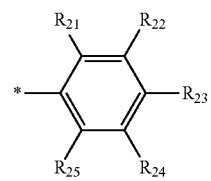

(a)

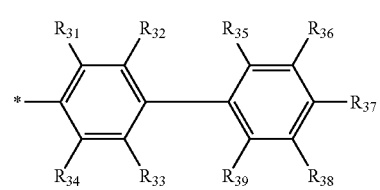

(b)

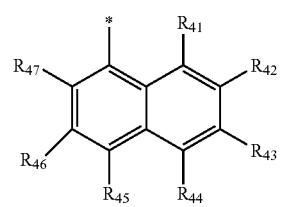

(c)

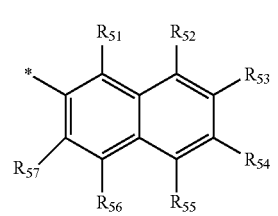

(d)

(in General formulas (a) to (d), asterisks indicate binding sites, $R_{21}$-$R_{57}$ each independently represent a hydrogen atom, a fluorine atom, a chlorine atom, a bromine atom, a linear or branched alkyl group with 1-4 carbon atoms, or a linear or branched alkoxy group with 1-7 carbon atoms).

<2> The thermoplastic resin according to <1> above, which is a polycarbonate resin or a polyester carbonate resin.

<3> The thermoplastic resin according to either one of <1> and <2> above, wherein $R_1$ and $R_{11}$ in General formula (1) above are each independently a linear or branched alkyl group with 1-4 carbon atoms.

<4> The thermoplastic resin according to any one of <1> to <3>, wherein X in General formula (1) above is selected from the group consisting of a phenyl group, a biphenyl group, a 1-naphthyl group, and a 2-naphthyl group.

<5> The thermoplastic resin according to any one of <1> to <4> above, wherein the monomer represented by General formula (1) above consists of Isomer B represented by the following formula alone or a mixture of said Isomer B and Isomer A represented by the following formula:

Isomer A

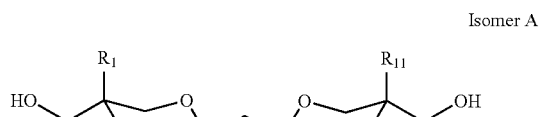

Isomer B

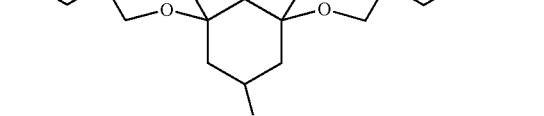

(in the above formulas, $R_1$, $R_{11}$ and X are the same as those in General formula (1)).

<6> The thermoplastic resin according to <5> above, wherein the isomer ratio of Isomer A to Isomer B is A:B=0:100-99:1.

<7> The thermoplastic resin according to any one of <1> to <6> above, wherein the thermoplastic resin comprises a structural unit (B) derived from a monomer represented by General formula (2) below and/or a structural unit (C) derived from a monomer represented by General formula (3) below:

(2)

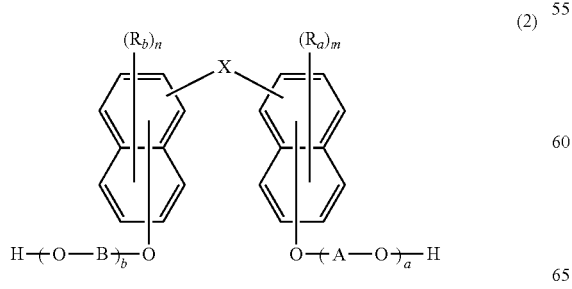

(in General formula (2), $R_a$ and $R_b$ are each independently selected from the group consisting of a hydrogen atom, a halogen atom, an optionally substituted alkyl group with 1-20 carbon atoms, an optionally substituted alkoxyl group with 1-20 carbon atoms, an optionally substituted cycloalkyl group with 5-20 carbon atoms, an optionally substituted cycloalkoxyl group with 5-20 carbon atoms, an optionally substituted aryl group with 6-20 carbon atoms, an optionally substituted heteroaryl group with 6-20 carbon atoms containing one or more heteroatoms selected from O, N and S, an optionally substituted aryloxy group with 6-20 carbon atoms, and —C≡C—$R_h$, $R_h$ represents an optionally substituted aryl group with 6-20 carbon atoms or an optionally substituted heteroaryl group with 6-20 carbon atoms containing one or more heteroatoms selected from O, N and S, X represents a single bond or an optionally substituted fluorene group, A and B each independently represent an optionally substituted alkylene group with 1-5 carbon atoms, m and n each independently represent an integer from 0 to 6, and a and b each independently represent an integer from 0 to 10);

(3)

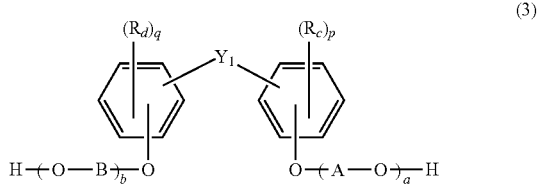

(in General formula (3), $R_c$ and $R_d$ are each independently selected from the group consisting of a hydrogen atom, a halogen atom, an optionally substituted alkyl group with 1-20 carbon atoms, an optionally substituted alkoxyl group with 1-20 carbon atoms, an optionally substituted cycloalkyl group with 5-20 carbon atoms, an optionally substituted cycloalkoxyl group with 5-20 carbon atoms, and an optionally substituted aryl group with 6-20 carbon atoms, $Y_1$ is a single bond, an optionally substituted fluorene group, or any of the structural formulas represented by Formulas (4) to (10) below:

(4)

(5)

(6)

(7)

-continued

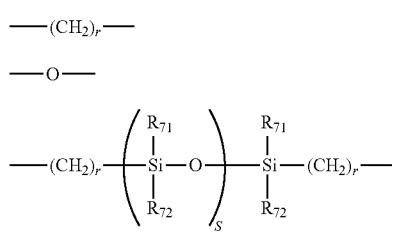

(in Formulas (4) to (10), $R_{61}$, $R_{62}$, $R_{71}$ and $R_{72}$ each independently represent a hydrogen atom, a halogen atom, an optionally substituted alkyl group with 1-20 carbon atoms or an optionally substituted aryl group with 6-30 carbon atoms, or $R_{61}$ and $R_{62}$ or $R_{71}$ and $R_{72}$ are bonded to each other to form an optionally substituted carbon or heterocyclic ring with 1-20 carbon atoms, and r and s each independently represent an integer from 0 to 5,000), A and B each independently represent an optionally substituted alkylene group with 1-5 carbon atoms, p and q each independently represent an integer from 0 to 4, and a and b each independently represent an integer from 0 to 10).

<8> The thermoplastic resin according to <7> above, wherein, in General formulas (2) and (3) above, A and B each independently represent an alkylene group with 2 or 3 carbon atoms.

<9> The thermoplastic resin according to either one of <7> and <8> above, wherein the thermoplastic resin contains at least a structural unit derived from any of BPEF, BNE, BNEF, and DPBHBNA.

<10> The thermoplastic resin according to any one of <1> to <9> above, wherein the thermoplastic resin further contains a structural unit derived from at least one monomer selected from the following group of monomers:

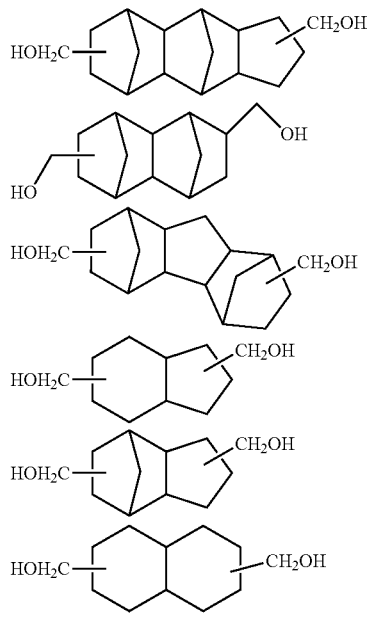

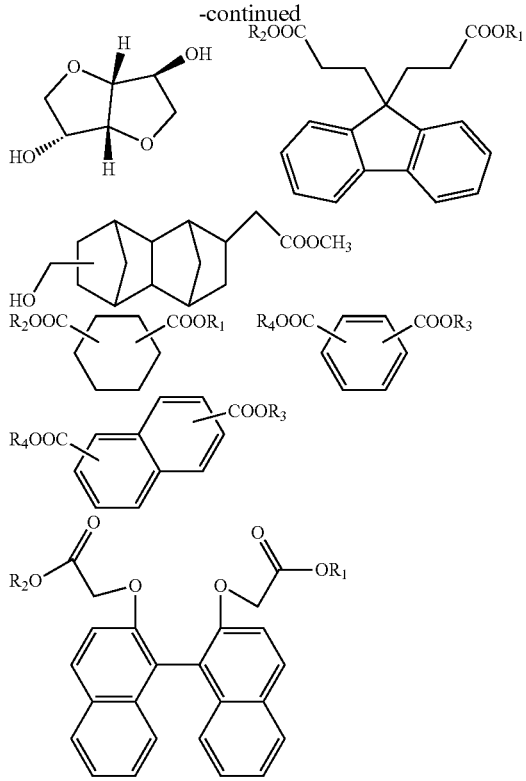

(in the above formulas, $R_1$ and $R_2$ each independently represent a hydrogen atom, a methyl group or an ethyl group, and $R_3$ and $R_4$ each independently represent a hydrogen atom, a methyl group, an ethyl group or an alkylene glycol with 2-5 carbon atoms).

<11> The thermoplastic resin according to any one of <1> to <10> above, wherein the weight-average molecular weight (Mw) of the thermoplastic resin in terms of polystyrene equivalent is 10,000-200,000.

<12> The thermoplastic resin according to any one of <1> to <11> above, wherein the refractive index (nD) of the thermoplastic resin is 1.599-1.750.

<13> The thermoplastic resin according to any one of <1> to <12> above, wherein the Abbe number (v) of the thermoplastic resin is 25.0-33.0.

<14> The thermoplastic resin according to any one of <1> to <13> above, wherein the glass transition temperature of the thermoplastic resin is 135-200° C.

<15> A thermoplastic resin composition comprising a modifier represented by General formula (1) below and a thermoplastic resin:

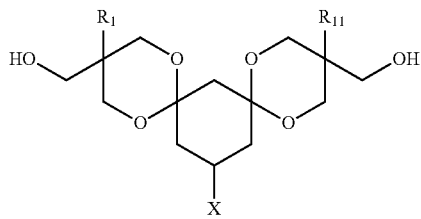

(in General formula (1), $R_1$ and $R_{11}$ each independently represent a hydrogen atom, an aryl group with 6-12 carbon atoms, or a linear or branched alkyl group with 1-4 carbon atoms, and X represents any of General formulas (a) to (d) below):

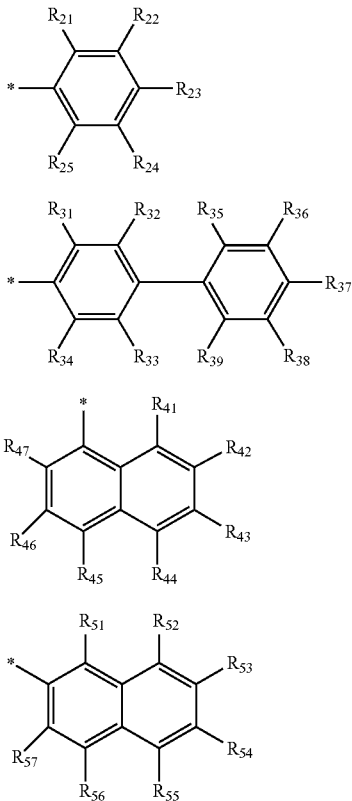

(in General formulas (a) to (d), asterisks indicate binding sites, $R_{21}$-$R_{57}$ each independently represent a hydrogen atom, a fluorine atom, a chlorine atom, a bromine atom, a linear or branched alkyl group with 1-4 carbon atoms, or a linear or branched alkoxy group with 1-7 carbon atoms).

<16> An optical component comprising the thermoplastic resin according to any one of <1> to <14> above or the thermoplastic resin composition according to <15> above.
<17> An optical lens comprising the thermoplastic resin according to any one of <1> to <14> above or the thermoplastic resin composition according to <15> above.
<18> An optical film comprising the thermoplastic resin according to any one of <1> to <14> above or the thermoplastic resin composition according to <15> above.

Effects of the Invention

The present invention is capable of providing a resin with abundant aliphatic component, which has excellent optical properties including refractive index and Abbe number and which also has excellent heat resistance, and the present invention is capable of providing an optical lens using the same.

MODE FOR CARRYING OUT THE INVENTION

Hereinafter, the present invention will be described in detail by illustrating synthesis examples, examples, etc. The present invention, however, is not limited to these synthesis examples, examples, etc. that are illustrated, and may be modified in any way without significantly departing from the scope of the present invention.

<Thermoplastic Resin>

One embodiment of the present invention is a thermoplastic resin comprising a structural unit (A) derived from a monomer represented by General formula (1) below:

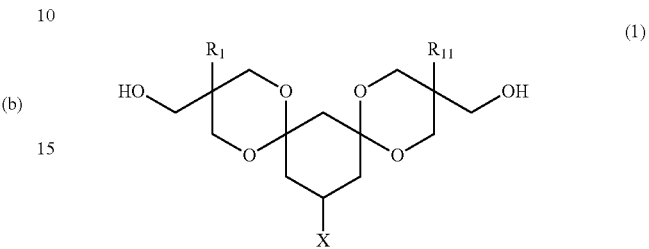

(in General formula (1), $R_1$ and $R_{11}$ each independently represent a hydrogen atom, an aryl group with 6-12 (preferably 6-10, more preferably 6) carbon atoms, or a linear or branched alkyl group with 1-4 carbon atoms, and X represents any of General formulas (a) to (d) below):

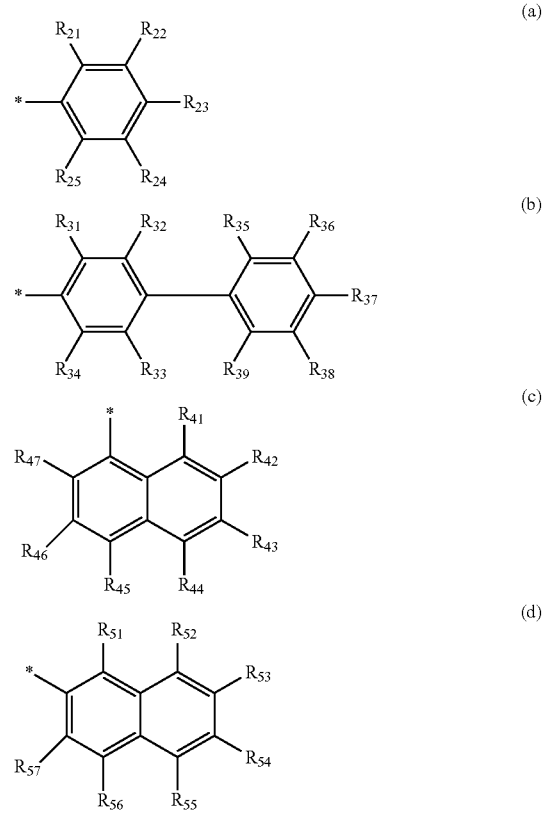

(in General formulas (a) to (d), asterisks indicate binding sites, $R_{21}$-$R_{57}$ each independently represent a hydrogen atom, a fluorine atom, a chlorine atom, a bromine atom, a linear or branched alkyl group with 1-4 carbon atoms, or a linear or branched alkoxy group with 1-7 carbon atoms).

Preferable examples of the structure represented by General formula (a) include the following structures.

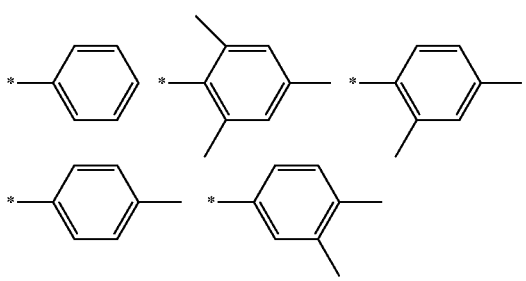

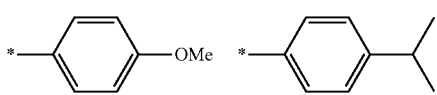

Preferable examples of the structure represented by General formula (d) include the following structures.

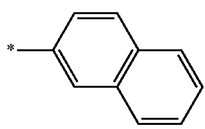

Examples of the linear or branched alkyl groups with 1-4 carbon atoms represented by $R_1$ and $R_{11}$ in General formula (1) include, but are not particularly limited to, alkyl groups such as a methyl group, ethyl group, n-propyl group, isopropyl group, n-butyl group, isobutyl group, sec-butyl group, and tert-butyl group. Among these, a methyl group, ethyl group, isobutyl group, and tert-butyl group are preferable, and an ethyl group and methyl group are particularly preferable.

Particularly preferable examples of the aryl groups with 6-12 carbon atoms represented by $R_1$ and $R_{11}$ in General formula (1) include a phenyl group.

In General formula (1), X is represented by any of General formulas (a) to (d), and examples of the linear or branched alkyl groups with 1-4 carbon atoms represented by $R_{21}$-$R_{57}$ include, but are not particularly limited to, alkyl groups such as a methyl group, ethyl group, n-propyl group, isopropyl group, n-butyl group, isobutyl group, sec-butyl group, and tert-butyl group. Moreover, examples of the linear or branched alkoxy groups with 1-7 carbon atoms include, but are not limited to, alkoxy groups such as a methoxy group and ethoxy group.

In General formulas (a) to (d), $R_{21}$-$R_{57}$ are preferably hydrogen atoms. Specifically, X is preferably a phenyl group (General formula (a)), a biphenyl group (General formula (b)), a 1-naphthyl group (General formula (c)), or a 2-naphthyl group (General formula (d)). Among these, a phenyl group is more preferable.

Among the cyclic diol compounds represented by General formula (1), specific examples of preferable structural formulas include the following.

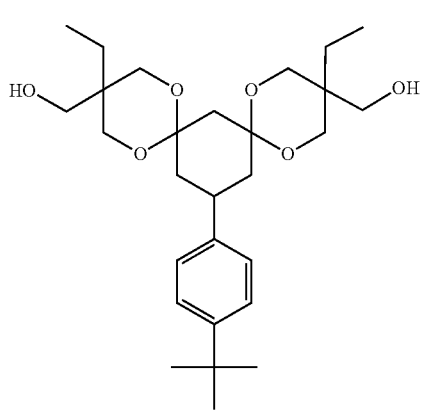

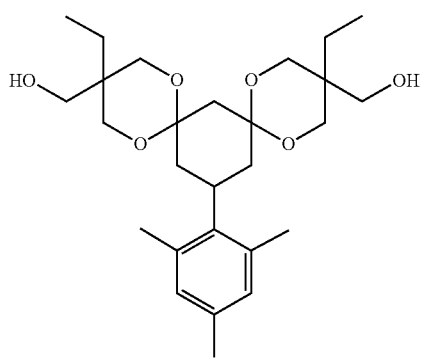

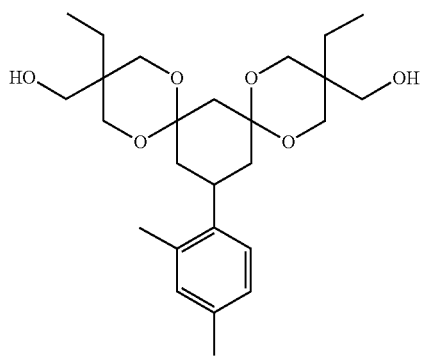

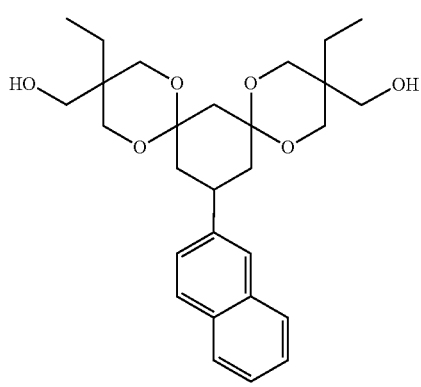

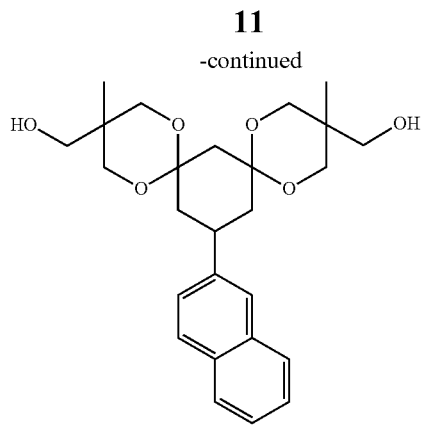

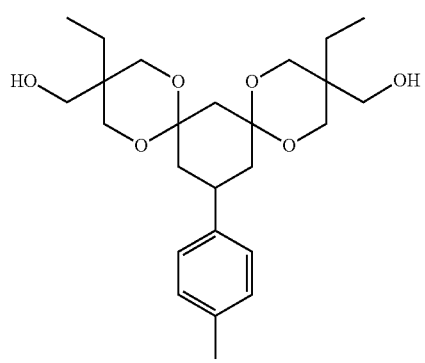

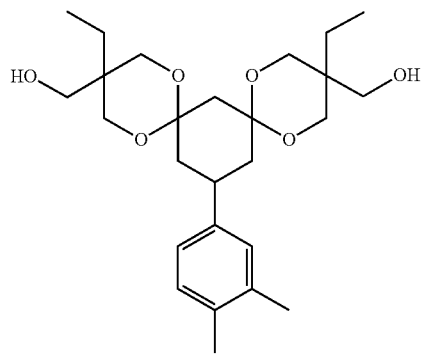

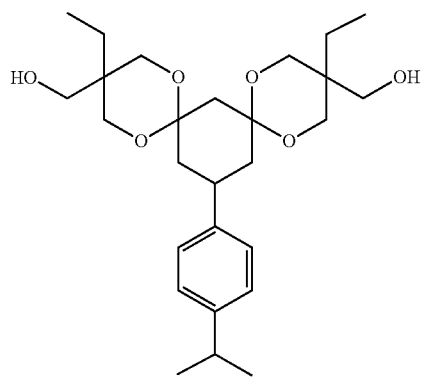

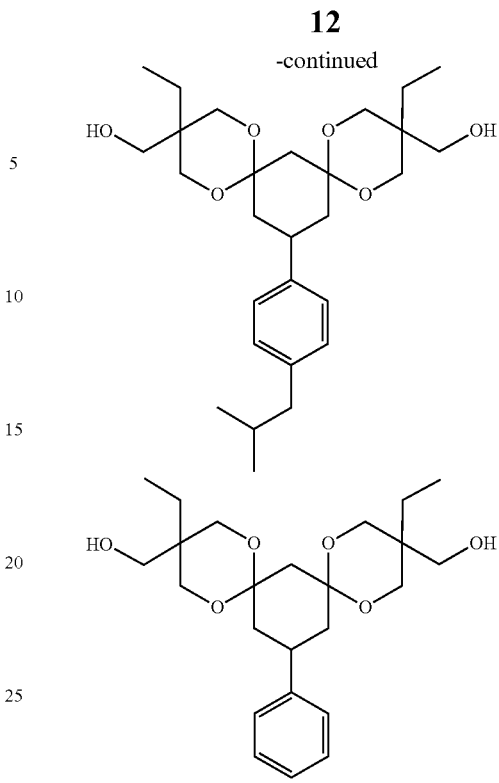

Specific examples of the cyclic diol compound represented by General formula (1) include 5-phenyl-1,3-cyclohexanedione trimethylolpropane diacetal, 5-(4-methylphenyl)-1,3-cyclohexanedione trimethylolpropane diacetal, 5-(4-ethylphenyl)-1,3-cyclohexanedione trimethylolpropane diacetal, 5-(3,4-dimethylphenyl)-1,3-cyclohexanedione trimethylolpropane diacetal, 5-(2,4-dimethylphenyl)-1,3-cyclohexanedione trimethylolpropane diacetal, 5-(3-fluoro-4-methylphenyl)-1,3-cyclohexanedione trimethylolpropane diacetal, 5-(4-isopropylphenyl)-1,3-cyclohexanedione trimethylolpropane diacetal, 5-(2,4,6-trimethylphenyl)-1,3-cyclohexanedione trimethylolpropane diacetal, 5-(2,4,5-trimethylphenyl)-1,3-cyclohexanedione trimethylolpropane diacetal, 5-(3-chloro-4-methylphenyl)-1,3-cyclohexanedione trimethylolpropane diacetal, 5-(4-butylphenyl)-1,3-cyclohexanedione trimethylolpropane diacetal, 5-(4-tert-butylphenyl)-1,3-cyclohexanedione trimethylolpropane diacetal, 5-(4-isobutylphenyl)-1,3-cyclohexanedione trimethylolpropane diacetal, 5-(pentamethylphenyl)-1,3-cyclohexanedione trimethylolpropane diacetal, 5-(4-biphenyl)-1,3-cyclohexanedione trimethylolpropane diacetal, 5-(3-bromo-4-methylphenyl)-1,3-cyclohexanedione trimethylolpropane diacetal, 5-(4-chlorobiphenyl)-1,3-cyclohexanedione trimethylolpropane diacetal, 5-(3-methylphenyl)-1,3-cyclohexanedione trimethylolpropane diacetal, 5-(3,5-dimethylphenyl)-1,3-cyclohexanedione trimethylolpropane diacetal, 5-(4-fluoro-3-methylphenyl)-1,3-cyclohexanedione trimethylolpropane diacetal, 5-(4-methoxy-2,3,6-trimethylphenyl)-1,3-cyclohexanedione trimethylolpropane diacetal, 5-(3-biphenyl)-1,3-cyclohexanedione trimethylolpropane diacetal, 5-(2-bromo-5-methylphenyl)-1,3-cyclohexanedione trimethylolpropane diacetal, 5-(3,5-di-tert-butylphenyl)-1,3-cyclohexanedione trimethylolpropane diacetal, 5-(2-methylphenyl)-1,3-cyclohexanedione trimethylolpropane diacetal, 5-(2,3-dimethylphenyl)-1,3-cyclohexanedione trimethylolpropane diacetal, 5-(2,6-dimethylphenyl)-1,3-cyclohexanedione trimethylolpropane diacetal, 5-(5-fluoro-2-methylphenyl)-1,3-cyclohexanedione trimethylolpropane diacetal, 5-(4-fluoro-2-methylphenyl)-1,3-cyclohexanedione trimethylolpropane diacetal, 5-(3-fluoro-2-methylphenyl)-1,3-cyclohexanedione trimethylolpropane diacetal, 5-(5-bromo-2-methylphenyl)-1,3-cyclohexanedione trimethylolpropane diacetal, 5-(1-naphthalene)-1,3-cyclohexanedione trimethylolpropane diacetal, 5-(2-naphthalene)-1,3-cyclohexanedione trimethylolpropane diacetal, 5-(4-methoxyphenyl)-1,3-cyclohexanedione trimethylolpropane diacetal, 5-(4-ethoxyphenyl)-1,3-cyclohexanedione trimethylolpropane diacetal, 5-(3-fluoro-4-methoxyphenyl)-1,3-cyclohexanedione trimethylolpropane diacetal, 5-(2-fluoro-4-methoxyphenyl)-1,3-cyclohexanedione trimethylolpropane diacetal, 5-(4-isopropoxyphenyl)-1,3-cyclohexanedione trimethylolpropane diacetal, 5-(4-propoxyphenyl)-1,3-cyclohexanedione trimethylolpropane diacetal, 5-(2,4-dimethoxyphenyl)-1,3-cyclohexanedione trimethylolpropane diacetal, 5-(3,4-dimethoxyphenyl)-1,3-cyclohexanedione trimethylolpropane diacetal, 5-(3-chloro-4-methoxyphenyl)-1,3-cyclohexanedione trimethylolpropane diacetal, 5-(4-methoxy-2,3,6-trimethylphenyl)-1,3-cyclohexanedione trimethylolpropane diacetal, 5-(4-tert-butoxyphenyl)-1,3-cyclohexanedione trimethylolpropane diacetal, 5-(2,4-dimethoxy-3-methylphenyl)-1,3-cyclohexanedione trimethylolpropane diacetal, 5-(3-ethoxy-4-methoxyphenyl)-1,3-cyclohexanedione trimethylolpropane diacetal, 5-(4-ethoxy-3-methoxyphenyl)-1,3-cyclohexanedione trimethylolpropane diacetal, 5-(2-fluoro-4,5-dimethoxyphenyl)-1,3-cyclohexanedione trimethylolpropane diacetal, 5-(4-amyloxyphenyl)-1,3-cyclohexanedione trimethylolpropane diacetal, 5-(2,4-diethoxyphenyl)-1,3-cyclohexanedione trimethylolpropane diacetal, 5-(3,4-diethoxyphenyl)-1,3-cyclohexanedione trimethylolpropane diacetal, 5-(2,4,5-trimethoxyphenyl)-1,3-cyclohexanedione trimethylolpropane diacetal, 5-(3,4,5-trimethoxyphenyl)-1,3-cyclohexanedione trimethylolpropane diacetal, 5-(2,3,4-trimethoxyphenyl)-1,3-cyclohexanedione trimethylolpropane diacetal, 5-(2,4,6-trimethoxyphenyl)-1,3-cyclohexanedione trimethylolpropane diacetal, 5-(2-chloro-3,4-dimethoxyphenyl)-1,3-cyclohexanedione trimethylolpropane diacetal, 5-(4-hexyloxyphenyl)-1,3-cyclohexanedione trimethylolpropane diacetal, 5-(3-bromo-4-methoxyphenyl)-1,3-cyclohexanedione trimethylolpropane diacetal, 5-(4-heptyloxyphenyl)-1,3-cyclohexanedione trimethylolpropane diacetal, 5-(2-bromo-4,5-dimethoxyphenyl)-1,3-cyclohexanedione trimethylolpropane diacetal, 5-(3-bromo-4,5-dimethoxyphenyl)-1,3-cyclohexanedione trimethylolpropane diacetal, 5-(2-naphthyl)-1,3-cyclohexanedione trimethylolpropane diacetal, 5-(4-methoxy-1-naphthyl)-1,3-cyclohexanedione trimethylolpropane diacetal, 5-(2-methoxy-1-naphthyl)-1,3-cyclohexanedione trimethylolpropane diacetal, 5-(2-ethoxy-1-naphthyl)-1,3-cyclohexanedione trimethylolpropane diacetal, 5-(6-methoxy-2-naphthyl)-1,3-cyclohexanedione trimethylolpropane diacetal, 5-phenyl-1,3-cyclohexanedione trimethylolethane diacetal, 5-(4-methylphenyl)-1,3-cyclohexanedione trimethylolethane diacetal, 5-(4-ethylphenyl)-1,3-cyclohexanedione trimethylolethane diacetal, 5-(3,4-dimethylphenyl)-1,3-cyclohexanedione trimethylolethane diacetal, 5-(2,4-dimethylphenyl)-1,3-cyclohexanedione trimethylolethane diacetal, 5-(3-(fluoro-4-methylphenyl)-1,3-cyclohexanedione trimethylolethane diacetal, 5-(4-isopropylphenyl)-1,3-cyclohexanedione trimethylolethane diacetal, 5-(2,4,6-trimethylphenyl)-1,3-cyclohexanedione trimethylolethane diacetal, 5-(2,4,5-trimethylphenyl)-1,3-cyclohexanedione trimethylolethane diacetal, 5-(3-chloro-4-methylphenyl)-1,3-cyclohexanedione trimethylolethane diacetal, 5-(4-butylphenyl)-1,3-cyclohexanedione trimethylolethane diacetal, 5-(4-tert-butylphenyl)-1,3-cyclohexanedione trimethylolethane diacetal, 5-(4-isobutylphenyl)-1,3-cyclohexanedione trimethylolethane diacetal, 5-(pentamethylphenyl)-1,3-cyclohexanedione trimethylolethane diacetal, 5-(4-biphenyl)-1,3-cyclohexanedione trimethylolethane diacetal, 5-(3-bromo-4-methylphenyl)-1,3-cyclohexanedione trimethylolethane diacetal, 5-(4-chlorobiphenyl)-1,3-cyclohexanedione trimethylolethane diacetal, 5-(3-methylphenyl)-1,3-cyclohexanedione trimethylolethane diacetal, 5-(3,5-dimethylphenyl)-1,3-cyclohexanedione trimethylolethane diacetal, 5-(4-fluoro-3-methylphenyl)-1,3-cyclohexanedione trimethylolethane diacetal, 5-(4-methoxy-2,3,6-trimethylphenyl)-1,3-cyclohexanedione trimethylolethane diacetal, 5-(3-biphenyl)-1,3-cyclohexanedione trimethylolethane diacetal, 5-(2-bromo-5-methylphenyl)-1,3-cyclohexanedione trimethylolethane diacetal, 5-(3,5-di-tert-butylphenyl)-1,3-cyclohexanedione trimethylolethane diacetal, 5-(2-methylphenyl)-1,3-cyclohexanedione trimethylolethane diacetal, 5-(2,3-dimethylphenyl)-1,3-cyclohexanedione trimethylolethane diacetal, 5-(2,6-dimethylphenyl)-1,3-cyclohexanedione trimethylolethane diacetal, 5-(5-fluoro-2-methylphenyl)-1,3-cyclohexanedione trimethylolethane diacetal, 5-(4-fluoro-2-methylphenyl)-1,3-cyclohexanedione trimethylolethane diacetal, 5-(3-fluoro-2-methylphenyl)-1,3-cyclohexanedione trimethylolethane diacetal, 5-(5-bromo-2-methylphenyl)-1,3-cyclohexanedione trimethylolethane diacetal, 5-(1-naphthyl)-1,3-cyclohexanedione trimethylolethane diacetal, 5-(2-naphthyl)-1,3-cyclohexanedione trimethylolethane diacetal, 5-(4-methoxyphenyl)-1,3-cyclohexanedione trimethylolethane diacetal, 5-(4-ethoxyphenyl)-1,3-cyclohexanedione trimethylolethane diacetal, 5-(3-fluoro-4-methoxyphenyl)-1,3-cyclohexanedione trimethylolethane diacetal, 5-(2-fluoro-4-methoxyphenyl)-1,3-cyclohexanedione trimethylolethane diacetal, 5-(4-isopropoxyphenyl)-1,3-cyclohexanedione trimethylolethane diacetal, 5-(4-propoxyphenyl)-1,3-cyclohexanedione trimethylolethane diacetal, 5-(2,4-dimethoxyphenyl)-1,3-cyclohexanedione trimethylolethane diacetal, 5-(3,4-dimethoxyphenyl)-1,3-cyclohexanedione trimethylolethane diacetal, 5-(3-chloro-4-methoxyphenyl)-1,3-cyclohexanedione trimethylolethane diacetal, 5-(4-methoxy-2,3,6-trimethylphenyl)-1,3-cyclohexanedione trimethylolethane diacetal, 5-(4-tert-butoxyphenyl)-1,3-cyclohexanedione trimethylolethane diacetal, 5-(2,4-dimethoxy-3-methylphenyl)-1,3-cyclohexanedione trimethylolethane diacetal, 5-(3-ethoxy-4-methoxyphenyl)-1,3-cyclohexanedione trimethylolethane diacetal, 5-(4-ethoxy-3-methoxyphenyl)-1,3-cyclohexanedione trimethylolethane diacetal, 5-(2-fluoro-4,5-dimethoxyphenyl)-1,3-cyclohexanedione trimethylolethane diacetal, 5-(4-amyloxyphenyl)-1,3-cyclohexanedione trimethylolethane diacetal, 5-(2,4-diethoxyphenyl)-1,3-cyclohexanedione trimethylolethane diacetal, 5-(3,4-diethoxyphenyl)-1,3-cyclohexanedione trimethylolethane diacetal, 5-(2,4,5-trimethoxyphenyl)-1,3-cyclohexanedione trimethylolethane diacetal, 5-(3,4,5-trimethoxyphenyl)-1,3-cyclohexanedione trimethylolethane diacetal, 5-(2,3,4-trimethoxyphenyl)-1,3-cyclohexanedione trimethylolethane diacetal, 5-(2,4,6-trimethoxyphenyl)-1,3-cyclohexanedione trimethylolethane diacetal, 5-(2-chloro-3,4-dimethoxyphenyl)-1,3-cyclohexanedione trimethylolethane diacetal, 5-(4-hexyloxyphenyl)-1,3-cyclohexanedione trimethylolethane diacetal, 5-(3-bromo-4-methoxyphenyl)-1,3-cyclohexanedione trimethylolethane diacetal, 5-(4-heptyloxyphenyl)-1,3-cyclohexanedione trimethylolethane diacetal, 5-(2-bromo-4,5- dimethoxyphenyl)-1,3-cyclohexanedione trimethylolethane diacetal, 5-(3-bromo-4,5-dimethoxyphenyl)-1,3-cyclohexanedione trimethylolethane diacetal, 5-(4-methoxy-1-naphthyl)-1,3-cyclohexanedione trimethylolethane diacetal, 5-(2-methoxy-1-naphthyl)-1,3-cyclohexanedione trimethylolethane diacetal, 5-(2-ethoxy-1-naphthyl)-1,3-cyclohexanedione trimethylolethane diacetal, and 5-(6-methoxy-2-naphthyl)-1,3-cyclohexanedione trimethylolethane diacetal.

Preferable compounds among them are 5-phenyl-1,3-cyclohexanedione trimethylolpropane diacetal, 5-phenyl-1,3-cyclohexanedione trimethylolethane diacetal, 5-(4-tert-butylphenyl)-1,3-cyclohexanedione trimethylolpropane diacetal, 5-(2,4,6-trimethylphenyl)-1,3-cyclohexanedione trimethylolpropane diacetal, 5-(2,4-dimethylphenyl)-1,3-cyclohexanedione trimethylolpropane diacetal, 5-(4-methylphenyl)-1,3-cyclohexanedione trimethylolpropane diacetal, 5-(3,4-dimethylphenyl)-1,3-cyclohexanedione trimethylolpropane diacetal, 5-(4-methoxyphenyl)-1,3-cyclohexanedione trimethylolpropane diacetal, 5-(4-isopropylphenyl)-1,3-cyclohexanedione trimethylolpropane diacetal, 5-(4-isobutylphenyl)-1,3-cyclohexanedione trimethylolpropane diacetal, 5-(4-tert-butylphenyl)-1,3-cyclohexanedione trimethylolethane diacetal, 5-(4-biphenyl)-1,3-cyclohexanedione trimethylolpropane diacetal, 5-(4-biphenyl)-1,3-cyclohexanedione trimethylolethane diacetal, 5-(1-naphthyl)-1,3-cyclohexanedione trimethylolpropane diacetal, 5-(1-naphthyl)-1,3-cyclohexanedione trimethylolethane diacetal, 5-(2-naphthyl)-1,3-cyclohexanedione trimethylolpropane diacetal, and 5-(2-naphthyl)-1,3-cyclohexanedione trimethylolethane diacetal, and more preferable compounds are 5-phenyl-1,3-cyclohexanedione trimethylolpropane diacetal and 5-phenyl-1,3-cyclohexanedione trimethylolethane diacetal.

The cyclic diol compound represented by General formula (1) preferably consist only of Isomer B represented by the following formula, or a mixture of said Isomer B and Isomer A represented by the following formula. Examples of other isomers include Isomer C represented by the following formula.

Isomer A

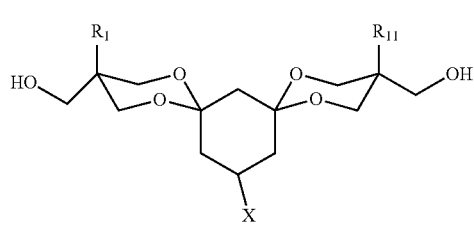

Isomer B

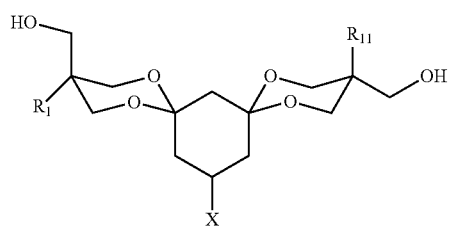

Isomer C

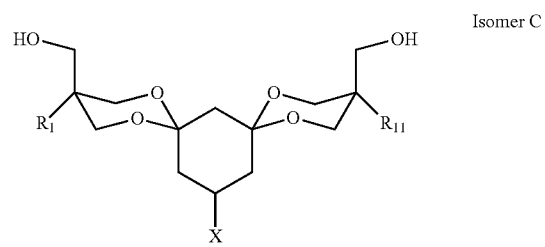

(In the above formulas, $R_1$, $R_{11}$ and X are the same as those in General formula (1)).

In one embodiment of the present invention, the isomer ratio of Isomer A to Isomer B above is preferably A:B=0:100-99:1, more preferably 0:100-50:50, and particularly preferably 20:80-50:50. The isomer ratio can be determined by gas chromatography (GC) analysis using the area normalization method.

The novel cyclic diol compound represented by General formula (1) can be produced, for example, as shown in Reaction formula (I) below.

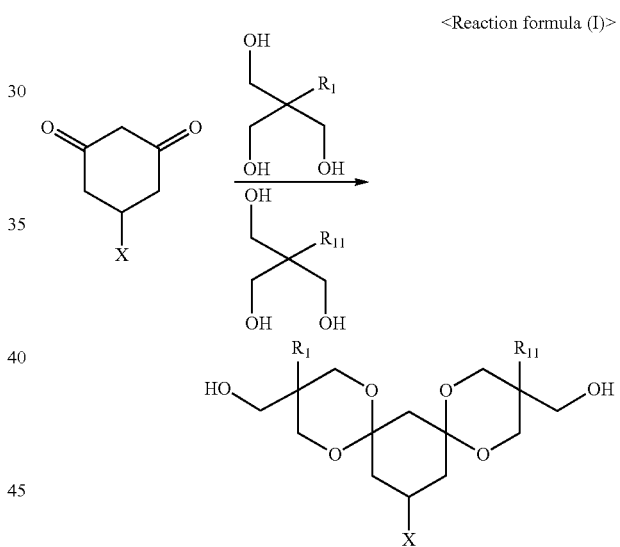

<Reaction formula (I)>

[In the above formula, $R_1$, $R_{11}$ and X are the same as those in General formula (1) above]

As shown in Reaction formula (I) above, one exemplary method for producing a novel cyclic diol compound represented by General formula (1) is a production method in which acetal reaction between a 1,3-cyclohexanedione compound having a substituent X at position 5 and 2-hydroxymethyl-1,3-propanediol compounds having substituent $R_1$ or $R_{11}$ at position 2 takes place in a toluene solvent in the presence of an acidic catalyst.

The above-mentioned 1,3-cyclohexanedione compound having substituent X at position 5 (compound represented by Formula (3) below) can be produced by allowing reaction between a compound represented by General formula (5) and a compound represented by General formula (6) in the presence of a base, and then treating it with an acid, as shown in Reaction formula (II) below.

<Reaction formula (II)>

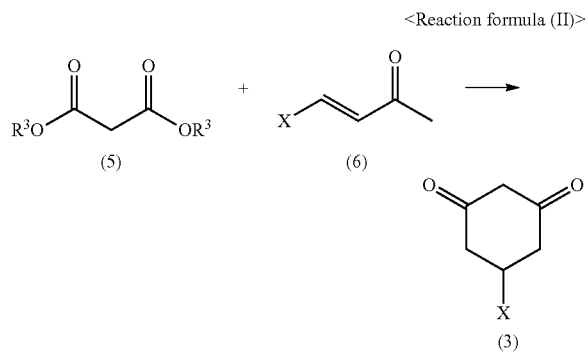

[In the above formula, $R_3$ identically or separately represent an alkyl group with 1-3 carbon atoms, and X is the same as above].

Examples of the alkyl group with 1-3 carbon atoms represented by $R_3$ include a methyl group, an ethyl group, and an isopropyl group.

This reaction can be carried out according to a known method, for example, Chemistry—A European Journal (2017), 23 (49), 11757-11760, Zhurnal Obshchei Khimii (1957), 27. 3087-92, etc.

A thermoplastic resin according to one embodiment of the present invention may be a polyester resin, polycarbonate resin, polyester carbonate resin, epoxy resin, polyurethane resin, polyacrylic ester resin, polymethacrylic ester resin, or the like. While there is no particular limitation, it is preferably a polycarbonate resin or a polyester carbonate resin and more preferably it contains a structural unit (A) represented by the following formula.

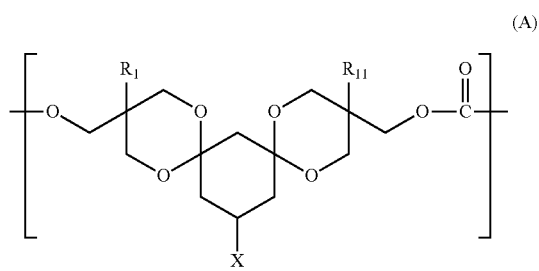

[In the above formula, $R_1$, $R_{11}$ and X are the same as those in General formula (1) above].

While the percentage of the structural unit (A) represented by the above formula with respect to all structural units in the thermoplastic resin according to one embodiment of the present invention is not particularly limited, it is preferably 1-80 mol %, more preferably 1-60 mol %, and particularly preferably 5-50 mol % relative to all structural units.

Specifically, the thermoplastic resin according to one embodiment of the present invention may contain, in addition to the structural unit (A) represented by the above formula, a structural unit derived from an aliphatic dihydroxy compound and a structural unit derived from an aromatic dihydroxy compound, which are generally used as structural units of polycarbonate and polyester carbonate resins.

Specifically, while there are a variety of aliphatic dihydroxy compounds, examples thereof particularly include 1,4-cyclohexanedimethanol, tricyclodecanedimethanol, 1,3-adamantanedimethanol, 2,2-bis(4-hydroxycyclohexyl)-propane, 3,9-bis(2-hydroxy-1,1-dimethylethyl)-2,4,8,10-tetraoxaspiro[5.5]undecane, 2-(5-ethyl-5-hydroxymethyl-1,3-dioxane-2-yl)-2-methylpropane-1-ol, isosorbide, 1,3-propanediol, 1,4 butanediol, and 1,6-hexanediol.

While there are a variety of aromatic dihydroxy compounds, examples thereof particularly include 2,2-bis(4-hydroxyphenyl)propane[bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkane, bis(4-hydroxyphenyl)oxide, bis(4-hydroxyphenyl)sulfide, bis(4-hydroxyphenyl)sulfone, bis(4-hydroxyphenyl)sulfoxide, bis(4-hydroxyphenyl)ketone, and bisphenoxyethanol fluorene.

The thermoplastic resin according to one embodiment of the present invention also preferably contains a structural unit (B) derived from a monomer represented by General formula (2) below.

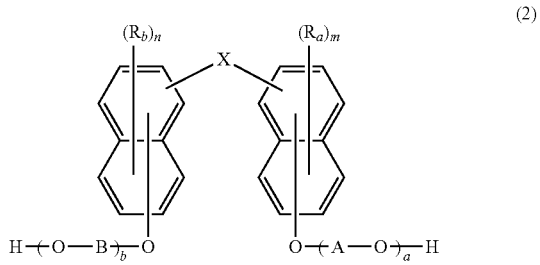

In General formula (2), $R_a$ and $R_b$ are each independently selected from the group consisting of a halogen atom, an optionally substituted alkyl group with 1-20 carbon atoms, an optionally substituted alkoxyl group with 1-20 carbon atoms, an optionally substituted cycloalkyl group with 5-20 carbon atoms, an optionally substituted cycloalicoxyl group with 5-20 carbon atoms, an optionally substituted aryl group with 6-20 carbon atoms, an optionally substituted heteroaryl group with 6-20 carbon atoms containing one or more heteroatoms selected from O, N and S, an optionally substituted aryloxy group with 6-20 carbon atoms, and —C≡C—$R_h$, $R_h$ represents an optionally substituted aryl group with 6-20 carbon atoms or an optionally substituted heteroaryl group with 6-20 carbon atoms containing one or more heteroatoms selected from O, N and S, $R_a$ and $R_b$ are preferably hydrogen atoms, optionally substituted aryl groups with 6-20 carbon atoms, or optionally substituted heteroaryl groups with 6-20 carbon atoms containing one or more heteroatoms selected from O, N and S. More preferably, they are hydrogen atoms or optionally substituted aryl groups with 6-20 carbon atoms, and still more preferably hydrogen atoms or optionally substituted aryl groups with 6-12 carbon atoms.

In General formula (2), X represents a single bond or an optionally substituted fluorene group. X is preferably a single bond, or an optionally substituted fluorene group with a total of 12-20 carbon atoms.

In General formula (2), A and B are each independently an optionally substituted alkylene group with 1-5 carbon atoms, and preferably an alkylene group with 2 or 3 carbon atoms.

In General formula (2), m and n are each independently an integer from 0 to 6, preferably an integer from 0 to 3, and more preferably 0 or 1.

In General formula (2), a and b are each independently an integer from 0 to 10, preferably an integer from 1 to 3, and more preferably 1 or 2.

Specific examples of the structural unit (B) include those derived from 2,2'-bis(2-hydroxyethoxy)-1,1'-binaphthalene (BNE), DPBHBNA, etc.

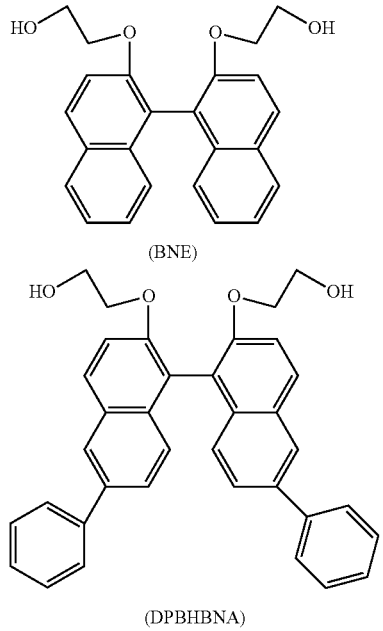

(BNE)

(DPBHBNA)

The thermoplastic resin according to one embodiment of the present invention also preferably has a structural unit (C) derived from a monomer represented by General formula (3) below.

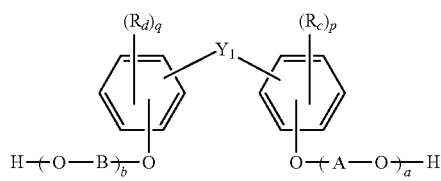

(3)

In General formula (3), $R_c$ and $R_d$ are each independently selected from the group consisting of a halogen atom, an optionally substituted alkyl group with 1-20 carbon atoms, an optionally substituted alkoxyl group with 1-20 carbon atoms, an optionally substituted cycloalkyl group with 5-20 carbon atoms, an optionally substituted cycloalkoxyl group with 5-20 carbon atoms, and an optionally substituted aryl group with 6-20 carbon atoms.

$R_c$ and $R_d$ are preferably hydrogen atoms, optionally substituted aryl groups with 6-20 carbon atoms, or optionally substituted heteroaryl groups with 6-20 carbon atoms containing one or more heteroatoms selected from O, N and S. More preferably, they are hydrogen atoms or optionally substituted aryl groups with 6-20 carbon atoms, and still more preferably hydrogen atoms or optionally substituted aryl groups with 6-12 carbon atoms.

In General formula (3), $Y_1$ is a single bond, an optionally substituted fluorene group, or any of the structural formulas represented by Formulas (4) to (10) below, and preferably a single bond or a structural formula represented by Formula (4) below.

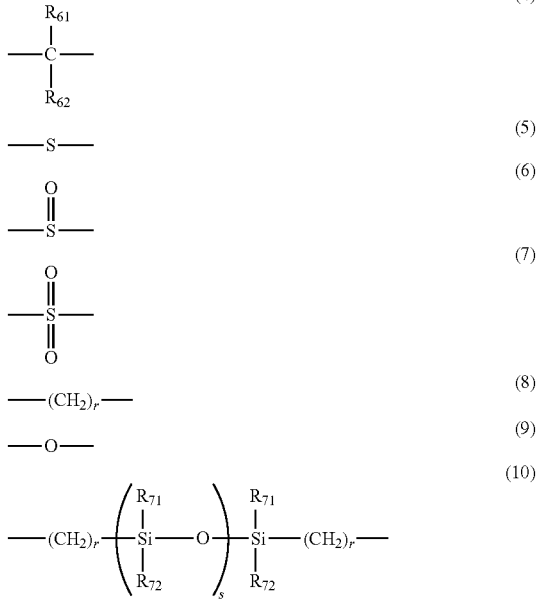

In Formulas (4) to (10), $R_{61}$, $R_{62}$, $R_{71}$ and $R_{72}$ each independently represent a hydrogen atom, a halogen atom, an optionally substituted alkyl group with 1-20 carbon atoms or an optionally substituted aryl group with 6-30 carbon atoms, or $R_{61}$ and $R_{62}$ or $R_{71}$ and $R_{72}$ are bonded to each other to form an optionally substituted carbon or heterocyclic ring with 1-20 carbon atoms.

In Formulas (4) to (10), r and s are each independently an integer from 0 to 5000.

In General formula (3) above, A and B are each independently an optionally substituted alkylene group with 1-5 carbon atoms, and preferably an alkylene group with 2 or 3 carbon atoms. In General formula (3), p and q are each independently an integer from 0 to 4, and preferably 0 or 1. Furthermore, in General formula (3) above, a and b are each independently an integer from 0 to 10, preferably an integer from 0 to 5, more preferably an integer from 0 to 2, and, for example, 0 or 1.

Specific examples of the structural unit (C) include those derived from BPEF (9,9-bis(4-(2-hydroxyethoxy)phenyl) fluorene), BPPEF (9,9-bis(4-(2-hydroxyethoxy)-3-phenylphenyl)fluorene), 9,9-bis[6-(2-hydroxyethoxy)naphthalene-2-yl]fluorene (BNEF), bisphenol A, bisphenol AP, bisphenol AF, bisphenol B, bisphenol BP, bisphenol C, bis(4-hydroxyphenyl)-2,2-dichloroethylene, bisphenol E, bisphenol F, bisphenol 0, bisphenol M, bisphenol S, bisphenol P, bisphenol PH, bisphenol TMC, bisphenol P-AP (4,4'-(1-phenylethylidene)bisphenol), bisphenol P-CDE (4,4'-cyclododecylidenebisphenol), bisphenol P-HTG (4,4'-(3,3,5-trimethylcyclohexylidene)bisphenol), bisphenol P-MIBK (4,4'-(1,3-dimethylbutylidene)bisphenol), bisphenol PEO-FL (bisphenoxyethanol fluorene), bisphenol P-3MZ (4-[1-(4-hydroxyphenyl)-3-methylcyclohexyl]phenol), bisphenol OC-FL (4,4'-[1-[4-[1-(4-hydroxyphenyl)-1-methylethyl] phenyl]ethylidene]bisphenol), bisphenol Z, BP-2EO (2,2'-[[1,1'-biphenyl]-4,4'-diylbis(oxy)bisethanol), S-BOC (4,4'-(1-methylethylidene)bis(2-methylphenol), and TrisP-HAP (4,4',4''-ethylidene trisphenol). Among these, those derived from BPEF or BNEF are preferable as the structural unit (C).

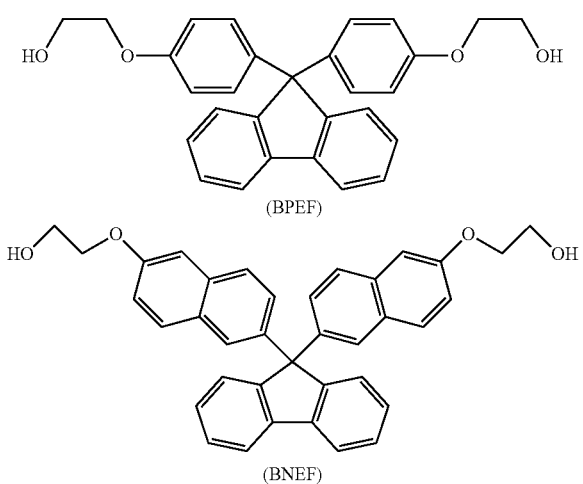

(BPEF)

(BNEF)

While the structural unit (A) is essential to the thermoplastic resin according to one embodiment of the present invention, the thermoplastic resin may be a polymer that contains the structural unit (B) but not the structural unit (C), a polymer that contains the structural unit (C) but not the structural unit (B), a copolymer having the structural units (B) and (C), a mixture of a polymer having the structural unit (B) and a polymer having the structural unit (C), or a combination thereof. Examples of the polymer that contains the structural unit (C) but not the structural unit (B) include those having the structural units represented by Formulas (I-1) to (I-3) below, while examples of the copolymer having the structural units (B) and (C) include those having the structural units represented by Formulas (II-1) to (II-4) below.

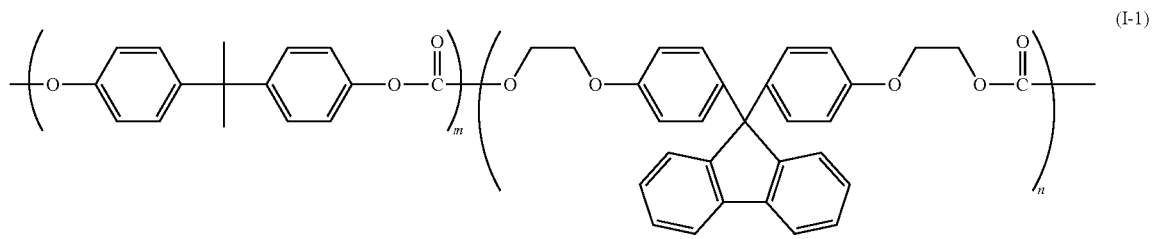

(I-1)

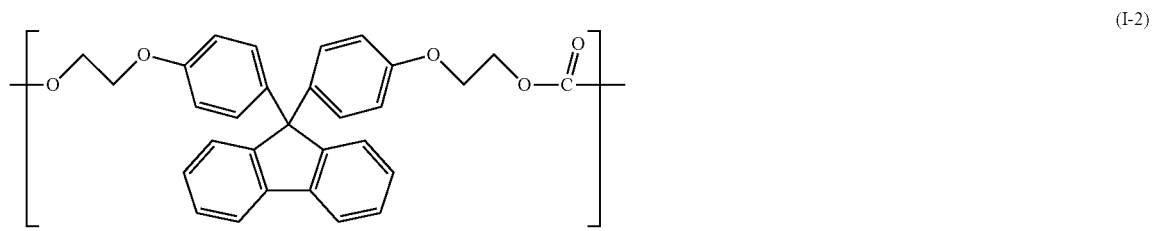

(I-2)

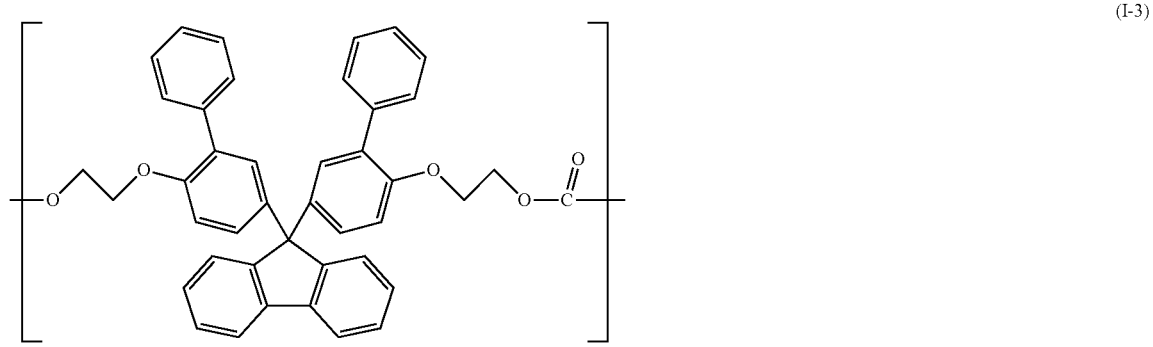

(I-3)

(In formula (1-1), m and n are each an integer from 1 to 10, preferably an integer from 1 to 5, and more preferably 1, and the number of repeating units in formula (I-3) is an integer from 1 to 10, preferably an integer from 1 to 5, and more preferably 1).

Although either a block copolymer in which m and n are high (e.g., 100 or higher) or a random copolymer can be used as the polymer having multiple types of structural units, it is preferable to use a random copolymer, and it is more preferable to use a random copolymer in which m and n are 1.

(In Formulas (II-1) to (II-4), m and n are each independently an integer from 1 to 10, preferably an integer from 1 to 5, and more preferably 1).

Although either a block copolymer in which m and n are high (e.g., 100 or higher) or a random copolymer can be used as the polymer having multiple types of structural units, it is preferable to use a random copolymer, and it is more preferable to use a random copolymer in which m and n are 1.

In the above copolymer, the mole ratio of the structural unit (B) to the structural unit (C) is preferably 1:99-99:1, more preferably 10:90-90:10, still more preferably 15:85-

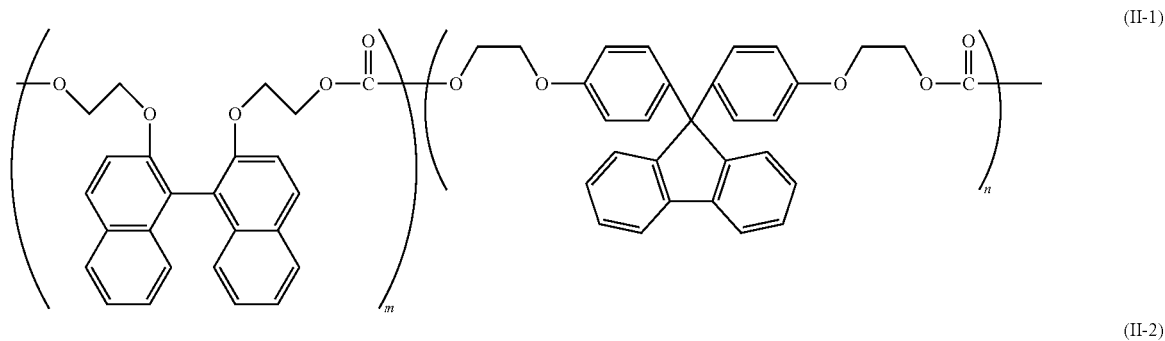

(II-1)

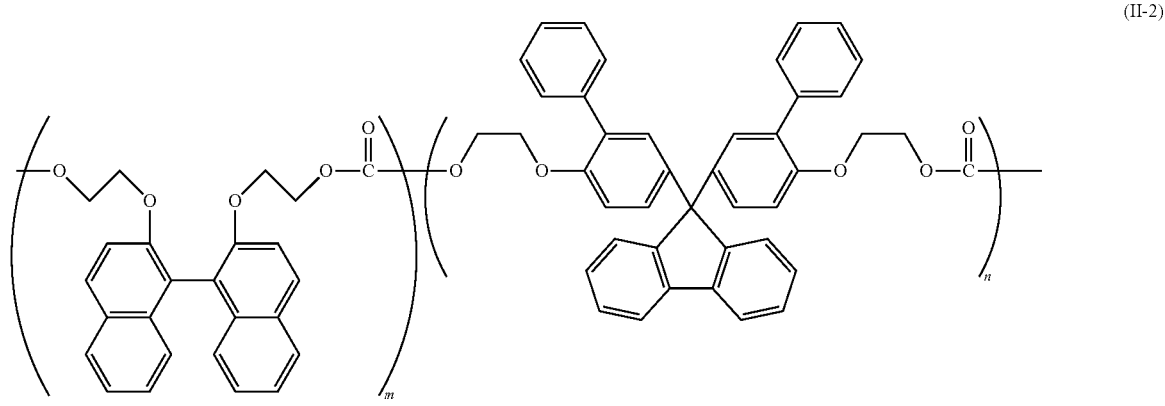

(II-2)

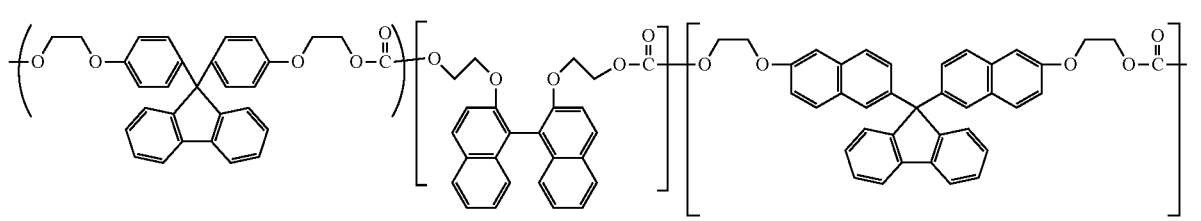

(II-3)

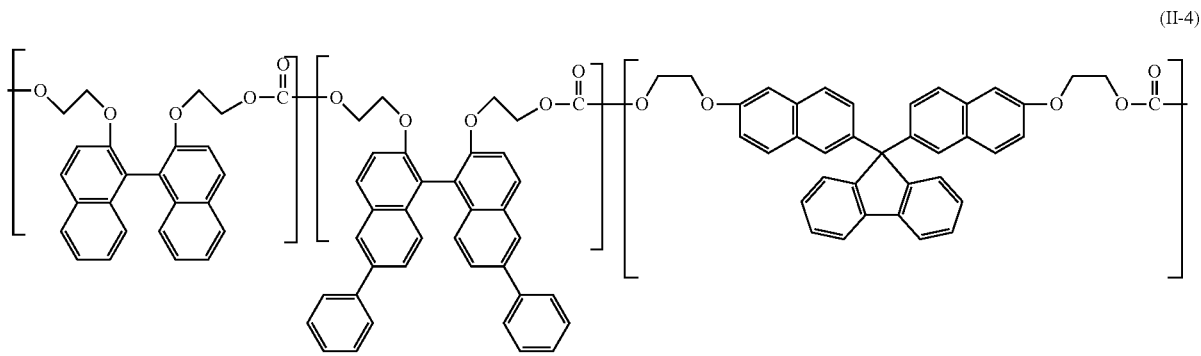

(II-4)

85:15, and particularly preferably 30:70-70:30. In the above mixture, the mass ratio of the polymer having the structural unit (B) to the polymer having the structural unit (C) is preferably 1:99-99:1, more preferably 10:90-90:10, still more preferably 15:85-85:15, and particularly preferably 30:70-70:30.

The thermoplastic resin according to one embodiment of the present invention preferably further contains a structural unit derived from at least one monomer selected from the following group of monomers.

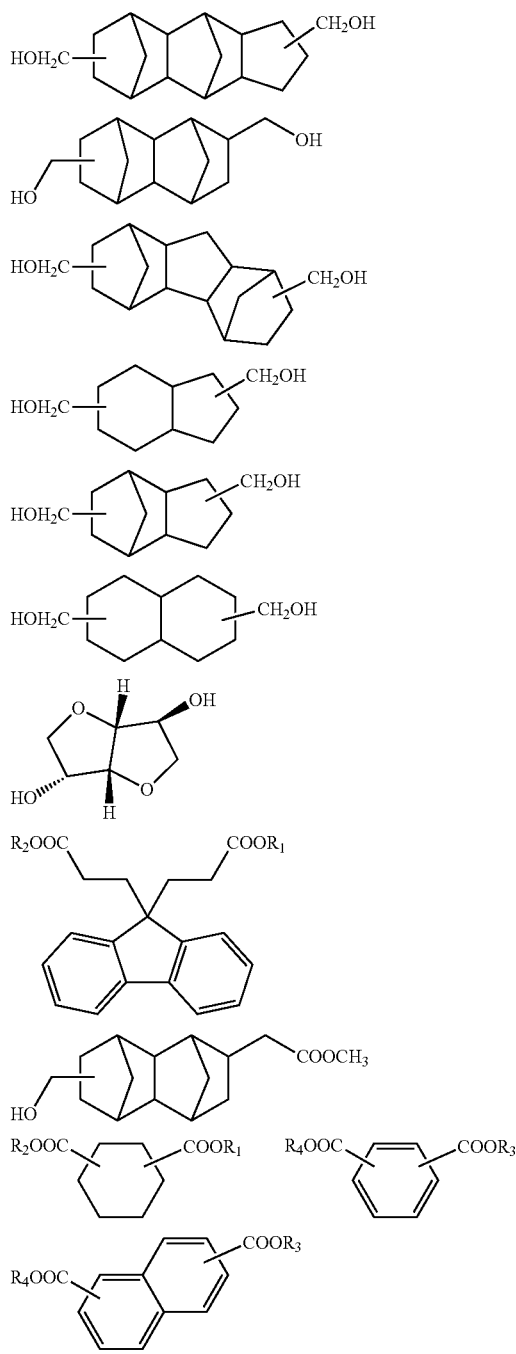

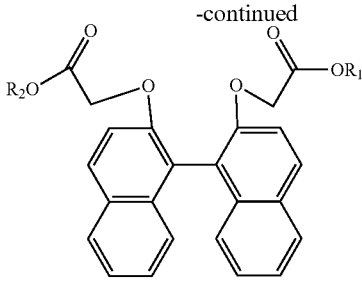

(In the above formulas, $R_1$ and $R_2$ each independently represent a hydrogen atom, a methyl group or an ethyl group, and $R_3$ and $R_4$ each independently represent a hydrogen atom, a methyl group, an ethyl group or an alkylene glycol with 2-5 carbon atoms).

In the polycarbonate resin according to one preferred embodiment of the present invention, alcohol-based compounds (e.g., phenolic compounds) that may be generated as by-products during production and diol components or carbonic acid diesters that remain unreacted may be present in it as impurities.

Alcohol-based compounds (e.g., phenolic compounds) and carbonic acid diesters, which are impurities, may cause a decrease in the strength and may cause odor in the molded products, so it is preferable to minimize their contents.

The content of the remaining phenolic compounds is preferably 3,000 mass ppm or less, more preferably 1,000 mass ppm or less, and particularly preferably 300 mass ppm or less relative to 100 mass % polycarbonate resin.

The content of the remaining diol compounds is preferably 1,000 mass ppm or less, more preferably 100 mass ppm or less, and particularly preferably 10 mass ppm or less relative to 100 mass % polycarbonate resin.

The content of the remaining carbonic acid diesters is preferably 1,000 mass ppm or less, more preferably 100 mass ppm or less, and particularly preferably 10 mass ppm or less relative to 100 mass % polycarbonate resin.

In particular, it is preferable that the contents of phenol, t-butylphenol, and other compounds is low, and that the contents of these compounds are within the above ranges.

The content of the phenolic compounds remaining in the polycarbonate resin can be measured by analyzing phenolic compounds extracted from the polycarbonate resin using gas chromatography.

The content of the alcohol-based compounds remaining in the polycarbonate resin can also be measured by analyzing alcohol-based compounds extracted from the polycarbonate resin using gas chromatography.

The content of the diol components and carbonic acid diesters remaining in the polycarbonate resin can also be measured by extracting these compounds from the polycarbonate resin and analyzing them using gas chromatography.

The contents of the alcohol-based compounds (e.g., phenolic compounds) as by-products, diol components, and carbonic acid diesters may be reduced to an undetectable level, but from the standpoint of productivity, they may be contained in small amounts as long as the benefit is not compromised. Moreover, if they are contained in small amounts, they can provide good plasticity during resin melting.

The content of each of the remaining phenolic compounds, diol components, or carbonic acid diesters may be, for example, 0.01 mass ppm or more, 0.1 mass ppm or more, or 1 mass ppm or more relative to 100 mass % polycarbonate resin.

The content of the remaining alcohol-based compounds may be, for example, 0.01 mass ppm or more, 0.1 mass ppm or more, or 1 mass ppm or more relative to 100 mass % polycarbonate resin.

It is possible to adjust the contents of the alcohol-based compounds (e.g., phenolic compounds) as by-products, diol components, and carbonic acid diesters in the polycarbonate resin to be in the above range by adjusting the polycondensation conditions and equipment settings as appropriate. They can also be adjusted by adjusting the conditions of the extrusion process following polycondensation.

For example, the amount of the alcohol-based compounds (e.g., phenolic compounds) remaining as by-products is related to the type of carbonic acid diester, polymerization reaction temperature, and polymerization pressure employed for the polymerization of the polycarbonate resin. By adjusting them, the amount of the alcohol-based compounds remaining as by-products (e.g., phenolic compounds) can be reduced.

For example, when a polycarbonate resin is produced using a dialkyl carbonate, such as diethyl carbonate, it is difficult to increase the molecular weight and thus results in a low-molecular-weight polycarbonate, which tends to have a higher content of alkyl alcohol-based compounds as by-products. Such alkyl alcohols are highly volatile, and if they remain in the polycarbonate resin, the moldability of the resin is likely deteriorated. In addition, a high amount of alcohol-based compounds (e.g., phenolic compounds) remaining as by-products may cause odor problems during resin molding, or may cause a decrease in molecular weight due to the cleavage reaction of the resin backbone upon compounding. Therefore, the content of the alcohol-based compounds remaining as by-products in the resulting polycarbonate resin is preferably 3,000 mass ppm or less relative to the polycarbonate resin (100 mass %). The content of the remaining alcohol-based compounds is preferably 3,000 mass ppm or less, more preferably 1,000 mass ppm or less, and particularly preferably 300 mass ppm or less relative to 100 mass % polycarbonate resin.

<Physical Properties of Thermoplastic Resin>

(1) Refractive Index (nD)

In one embodiment of the present invention, one of the characteristics of the thermoplastic resin is a high refractive index, which is preferably 1.500-1.750, more preferably 1.599-1.750, still more particularly preferably 1.599-1.650, and particularly preferably 1.600-1.650. According to the present invention, the refractive index can be measured by the method described in EXAMPLES below.

(2) Abbe Number (v)

In one embodiment of the present invention, the Abbe number of the thermoplastic resin is preferably 20.0-55.0, more preferably 25.0-33.0, still more preferably 25.5-32.0, and particularly preferably 26.0-30.0. According to the present invention, the Abbe number can be measured by the method described in EXAMPLES below.

(3) Glass Transition Temperature (Tg)

In one embodiment of the present invention, one of the characteristics of the thermoplastic resin is high heat resistance, where the glass transition temperature (Tg) is preferably 135-200° C., more preferably 140-180° C., and particularly preferably 140-170° C. According to the present invention, the glass transition temperature can be measured by the method described in EXAMPLES below.

(4) Polystyrene-Equivalent Weight-Average Molecular Weight (Mw)

In one embodiment of the present invention, the weight-average molecular weight of the thermoplastic resin in terms of polystyrene equivalent is preferably 10,000-200,000, more preferably 10,000-100,000, and particularly preferably 10,000-80.000.

<Thermoplastic Resin Composition>

Another embodiment of the present invention is a thermoplastic resin composition comprising the above-described thermoplastic resin and an additive. The thermoplastic resin composition of this embodiment can be used in combination with a resin other than the thermoplastic resin of the present invention containing the above-mentioned structural unit (A) as long as the desired effect of this embodiment is not impaired. Examples of such a resin include, but are not limited to, at least one resin selected from the group consisting of a polycarbonate resin, polyester resin, polyester carbonate resin, (meth)acrylic resin, polyamide resin, polystyrene resin, cyclo-olefin resin, acrylonitrile-butadiene-styrene copolymer resin, polyvinyl chloride resin, polyphenylene ether resin, polysulfone resin, polyacetal resin, and methyl methacrylate-styrene copolymer resin. These resins can be of various known types and can be added alone or in combination of two or more to the thermoplastic resin composition.

[Antioxidant]

The thermoplastic resin composition preferably contains an antioxidant as the above-mentioned additive.

The antioxidant is preferably at least either one of phenolic antioxidant and phosphite-based antioxidant.

Examples of the phenolic antioxidant include 1,3,5-tris(3,5-di-tert-butyl-4-hydroxyphenylmethyl)-2,4,6-trimethylbenzene, 1,3,5-tris(3,5-di-tert-butyl-4-hydroxybenzyl)-1,3,5-triazine-2,4,6 (1H,3H,5H)-trione, 4,4',4"-(1-methylpropanyl-3-ylidene)tris(6-tert-butyl-m-cresol), 6,6'-di-tert-butyl-4,4'-butylidene di-m-cresol, octadecyl 3-(3,5-di-tert-butyl-4-hydroxyphenyl)propionate, pentaerythritol-tetrakis[3-(3,5-di-tert-butyl-4-hydroxyphenyl)propionate], 3,9-bis{2-[3-(3-tert-butyl-4-hydroxy-5-methylphenyl)propionyloxy]-1,1-dimethylethyl}-2,4,8,10-tetraoxospiro[5.5]undecane, and pentaerythritol-tetrakis[3-(3,5-di-tert-butyl-4-hydroxyphenyl)propionate]. Preferably, it is pentaerythritol-tetrakis[3-(3,5-di-tert-butyl-4-hydroxyphenyl)propionate]. Examples of the phosphite-based antioxidant include 2-ethylhexyl diphenyl phosphite, isodecyldiphenyl phosphite, triisodecyl phosphite, triphenyl phosphite, 3,9-bis(octadecyloxy)-2,4,8,10-tetraoxy-3,9 diphosphaspiro [5.5]undecane, 3,9-bis(2,6-di-tert-butyl-4-methylphenoxy)-2,4,8,10-tetraoxa-3,9-diphosphaspiro[5.5]undecane, 2,2'-methylenebis(4,6-di-tert-butylphenyl)2-ethylhexyl phosphite, tris(2,4-di-tert-butylphenyl)phosphite, tris(nonylphenyl)phosphite, tetra-C12-15-alkyl-(propane-2,2-diyl-bis(4,1-phenylene))bis(phosphite), and 3,9-bis(2,6-di-tert-butyl-4-methylphenoxy)-2,4,8,10-tetraoxa-3,9-diphosphaspiro[5.5]undecane. Preferably, it is 3,9-bis(2,6-di-tert-butyl-4-methylphenoxy)-2,4,8,10 tetraoxa-3,9-diphosphaspiro[5.5]undecane. As the antioxidant, one of the above-mentioned antioxidants may be used alone, or a mixture of two or more kinds of them may be used.

In the thermoplastic resin composition, the antioxidant is preferably contained in an amount of 1-3,000 ppm by weight based on the total weight of the resin composition. The content of the antioxidant in the thermoplastic resin composition is more preferably 50-2,500 ppm by weight, still more preferably 100-2,000 ppm by weight, yet still more preferably 150-1,500 ppm by weight, and even more preferably 200-1,200 ppm by weight.

[Mold Release Agent]

The thermoplastic resin composition preferably contains a mold release agent as the above-mentioned additive.

Examples of the mold release agent include an ester compound, for example, a glycerol fatty acid ester such as a mono/di-glyceride of a glycerol fatty acid, a glycol fatty acid ester such as propylene glycol fatty acid ester and sorbitan fatty acid ester, a higher alcohol fatty acid ester, and a full ester or mono-fatty acid ester of an aliphatic polyhydric alcohol and an aliphatic carboxylic acid. When an ester of an aliphatic polyhydric alcohol and an aliphatic carboxylic acid is used as the mold release agent, it may be any of a monoester, full ester, or the like. For example, it may not be a full ester but a monoester.

Specific examples of the mold release agent include the following:
- a sorbitan fatty acid ester such as sorbitan stearate, sorbitan laurate, sorbitan oleate, sorbitan trioleate, sorbitan tribehenate, sorbitan stearate, sorbitan tristearate, and sorbitan caprylate;
- a propylene glycol fatty acid ester such as propylene glycol monostearate, propylene glycol monooleate, propylene glycol monobehenate, propylene glycol monolaurate, and propylene glycol monopalmitate;
- a higher alcohol fatty acid ester such as stearyl stearate;
- a glycerol fatty acid ester monoglyceride, including: a monoglyceride such as glycerol monostearate, glycerol monohydroxystearate (e.g., glycerol mono-12-hydroxystearate), glycerol monooleate, glycerol monobehenate, glycerol monocaprylate, glycerol monocaprate, and glycerol monolaurate: and a mono/di-glyceride such as glycerol mono/di-stearate, glycerol mono/di-stearate, glycerol mono/di-behenate, and glycerol mono/di-olate;
- an acetylated monoglyceride of a glycerol fatty acid ester such as glycerol diacetomonolaurate;
- an organic acid monoglyceride of a glycerol fatty acid ester such as citric acid ester of monoglyceride of fatty acid, succinic acid ester of monoglyceride of fatty acid, and diacetyl tartaric acid ester of monoglyceride of fatty acid; and
- a polyglycerol fatty acid ester such as diglycerol stearate, diglycerol laurate, diglycerol oleate, diglycerol monostearate, diglycerol monolaurate, diglycerol monomyristate, diglycerol monooleate, tetraglycerol stearate, decaglycerol laurate, decaglycerol oleate, and polyglycerol polyricinoleate.

In the thermoplastic resin composition, the mold release agent is preferably contained in an amount of 1-5,000 ppm by weight based on the total weight of the resin composition. The content of the mold release agent in the thermoplastic resin composition is more preferably 50-4,000 ppm by weight, still more preferably 100-3,500 ppm by weight, yet still more preferably 500-13,000 ppm by weight, and even more preferably 1,000-2,500 ppm by weight.

[Other Additives]

In addition to the above-described antioxidant and mold release agent, other additives may be added to the thermoplastic resin composition. Examples of the additives that may be contained in the thermoplastic resin composition include a compounding agent, catalyst deactivator, heat stabilizer, plasticizer, filler, UV absorber, anti-rust agent, dispersant, defoaming agent, leveling agent, flame retardant, lubricant, dye, pigment, bluing agent, nucleating agent, and clarifying agent.

The content of additives other than the antioxidant and mold release agent in the thermoplastic resin composition is preferably, but not limited to, 10 ppm to 5.0% by weight, more preferably 100 ppm to 2.0% by weight, and still more preferably 1,000 ppm to 1.0% by weight.

The additives mentioned above may adversely affect the transmissivity and therefore should not be added in excess, and the total amount added is, for example, within the range mentioned above.

According to a method for producing a thermoplastic resin composition of the present invention, the catalyst may be removed or may be, but not necessarily, deactivated after the polymerization reaction is completed to maintain thermal and hydrolytic stability. Deactivation can suitably be performed by a process of deactivating the catalyst by addition of a known acidic substance. Specifically, the acidic substance suitably used may be an ester such as butyl benzoate; an aromatic sulfonic acid such as p-toluenesulfonic acid; an aromatic sulfonic ester such as butyl p-toluenesulfonate and hexyl p-toluenesulfonate; a phosphoric acid such as phosphorous acid, phosphoric acid and phosphonic acid; a phosphite ester such as triphenyl phosphite, monophenyl phosphite, diphenyl phosphite, diethyl phosphite, di-n-propyl phosphite, di-n-butyl phosphite, di-n-hexyl phosphite, dioctyl phosphite, and monooctyl phosphite; a phosphate such as triphenyl phosphate, diphenyl phosphate, monophenyl phosphate, dibutyl phosphate, dioctyl phosphate, and monooctyl phosphate; a phosphonic acid such as diphenyl phosphonate, dioctyl phosphonate, and dibutyl phosphonate; a phosphonic ester such as diethyl phenyl phosphonate; a phosphine such as triphenyl phosphine, and bis(diphenyl phosphino)ethane; a boric acid such as boric acid and phenylboronic acid; an aromatic sulfonate such as tetrabutylphosphonium salt with dodecylbenzenesulfonic acid; an organic halide such as stearoyl chloride, benzoyl chloride, and p-toluenesulfonate chloride; an alkyl sulfate such as dimethyl sulfate; and organic halide such as benzyl chloride. From the viewpoints of the effectiveness of the deactivator, stability on the resin, and the like, p-toluene or butyl sulfonate is particularly preferred. These deactivators are used in 0.01-50 times, preferably 0.3-20 times, the molar amount of the catalyst. If the amount is less than 0.01 times the molar amount of the catalyst, the deactivation effect will be inadequate, which is unfavorable. On the other hand, if the amount is greater than 50 times the molar amount of the catalyst, the heat resistance of the resin will decrease and the molded body will likely be colored, which are unfavorable.

The deactivator may be mixed immediately after the polymerization reaction is completed or after the polymerized resin is pelletized. In addition to the deactivator, other additives can be added in a similar manner.

Furthermore, another embodiment of the present invention is a thermoplastic resin composition comprising a modifier represented by General formula (1) below and a thermoplastic resin.

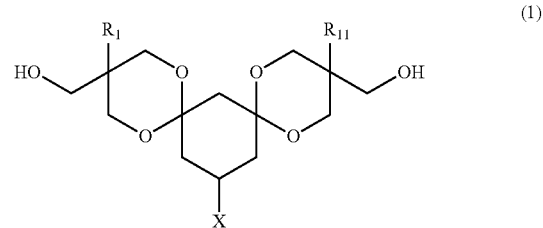

In General formula (1), $R_1$, $R_{11}$, and X are the same as those in General formula (1) above. In other words, the novel cyclic diol compound represented by General formula (1) can also be used as a modifier.

In one embodiment of the present invention, the above modifier can be formulated such that the mass ratio of the thermoplastic resin to the modifier is thermoplastic resin:modifier=99.9:0.1-70:30. The above mass ratio may preferably be 99:1-70:30, more preferably 98:2-70:30, and, for example 99:1, 98:2, 97:3, 96:4, 95:5, 94:6, 93:7, 92:8, 91:9, 90:10, 85:15, 80:20, 75:25, 70:30, etc. According to the present invention, a resin composition with high flowability and good moldability can be provided if the mass ratio of the thermoplastic resin to the modifier is within the above range.

<Optical Components>

The thermoplastic resin or thermoplastic resin composition of the present invention (hereinafter, simply abbreviated as the "resin composition") can suitably be used for optical components. In one embodiment of the present invention, an optical component containing the resin composition of the present invention is provided. In one embodiment of the present invention, optical components include, but are not limited to, optical discs, transparent conductive substrates, optical cards, sheets, films, optical fibers, lenses, prisms, optical membranes, wafers, optical filters, hard coat membranes, and the like. The resin composition of the present invention is particularly suitable for manufacturing a thin optical component because its high flowability allows molding by a casting method. In a preferred embodiment of the present invention, the optical component produced using the resin composition of the present invention may be an optical lens. Other than lenses for smartphones, specific examples of the optical lenses include lenses for in-vehicle cameras, lenses for VR (virtual reality) or MR (mixed reality) goggles, and lenses for security cameras. In another preferred embodiment of the present invention, the optical component produced using the resin composition of the present invention may be an optical film.

In a case where an optical component containing the resin composition of the present invention is manufactured by injection molding, molding is preferably carried out under the conditions of a cylinder temperature of 260-350° C. and a mold temperature of 90-170° C. More preferably, molding is carried out under the conditions of a cylinder temperature of 270-320° C. and a mold temperature of 100-160° C. If the cylinder temperature is higher than 350° C., the resin composition is decomposed and colored, and if the cylinder temperature is lower than 260° C., the melt viscosity is high and molding becomes difficult. If the mold temperature is higher than 170° C., removal of the molded piece consisting of the resin composition from the mold tends to be difficult. On the other hand, if the mold temperature is lower than 90° C., the resin hardens too quickly in the mold during molding, making it difficult to control the shape of the molded piece and also making it difficult to transfer the pattern of the mold sufficiently.

<Optical Lens>

In one embodiment of the present invention, the resin composition can suitably be used for optical lenses. Since optical lenses manufactured using the resin composition of the present invention have a high refractive index and excellent heat resistance, they are extremely useful for use in the fields that conventionally use expensive high-refractive-index glass lenses such as telescopes, binoculars, television projectors, and the like.

For example, a smartphone lens may be a lens unit obtained by placing a lens molded from a thermoplastic resin containing the structural unit (A) over a lens molded from a resin containing a structural unit represented by any of Formulas (II-1) to (II-4) or a resin containing a structural unit derived from a monomer represented by any of the following formulas:

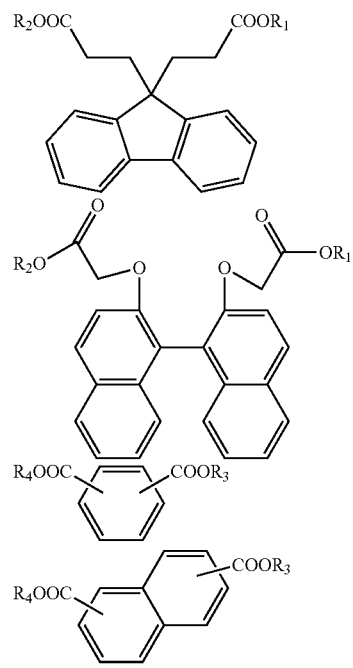

(in the above formulas, $R_1$ and $R_2$ each independently represent a hydrogen atom, a methyl group or an ethyl group, and $R_3$ and $R_4$ each independently represent a hydrogen atom, a methyl group, an ethyl group or an alkylene glycol with 2-5 carbon atoms).

The optical lens of the present invention is suitably implemented in the form of an aspherical lens as necessary. Since spherical aberration can be reduced to virtually zero with a single aspherical lens, there is no need to remove spherical aberration by combining multiple spherical lenses, which enables weight reduction and lower molding costs. Therefore, the aspherical lens is especially useful as a camera lens among other optical lenses.

In addition, the optical lens of the present invention is particularly useful as a material for a thin, small, and complex-shaped optical lens because of its high molding flowability. As specific lens sizes, the thickness at the center is preferably 0.05-3.0 mm, more preferably 0.05-2.0 mm, and still more preferably 0.1-2.0 mm. In addition, the diameter is preferably 1.0-20.0 mm, more preferably 1.0-10.0 mm, and still more preferably 3.0-10.0 mm. The shape of the lens is preferably convex on one side and concave on the other side, i.e., a meniscus lens.

The optical lens of the present invention can be formed by any method such as mold forming, cutting, polishing, laser machining, electrical discharge machining, etching, and so on. Among these methods, mold forming is more preferable in terms of manufacturing cost.

<Optical Film>

In one embodiment of the present invention, the resin composition can suitably be used for optical films. Specifically, since optical films produced using the polycarbonate resin of the present invention have excellent transparency and heat resistance, they are suitable for use in LCD substrate films, optical memory cards, and other applications. To avoid contamination of the optical lens with foreign matter as much as possible, the molding environment obviously needs to be a low dust environment, preferably class 6 or better, and more preferably class 5 or better.

EXAMPLES

Hereinafter, examples of the present invention will be described along with comparative examples to illustrate the present invention in detail, but the present invention is not limited to these examples.

1) Refractive Index (nD)

V-blocks were obtained by molding the polycarbonate resins in accordance with JIS B 7071-2:2018 and used as test pieces. Refractive index was measured at 23° C. using a refractometer (KPR-3000 manufactured by Shimadzu Corporation).

2) Abbe Number (v)

Using the same test pieces (V-blocks) as those used for the measurement of the refractive index, the refractive indices at wavelengths of 486 nm, 589 nm, and 656 nm were measured at 23° C. using a refractometer to calculate the Abbe number using the following formula.

$$v=(nD-1)/(nF-nC)$$

nD: Refractive index at wavelength of 589 nm
nC: Refractive index at wavelength of 656 nm
nF: Refractive index at wavelength of 486 nm 3) Glass Transition Temperature ('T'g)

Glass transition temperature was measured according to JIS K7121-1987, using a differential thermal scanning calorimeter (X-DSC7000 manufactured by Hitachi High-Tech Science Corporation) with a temperature increase program of 10° C./min.

4) Weight-Average Molecular Weight (Mw)

The weight-average molecular weights of the resins were measured by gel permeation chromatography (GPC) and calculated in terms of standard polystyrene. The equipment, columns, and measurement conditions employed were as follows.

GPC apparatus: HLC-8420GPC, manufactured by Tosoh Corporation
Columns: TSKgel SuperHM-M manufactured by Tosoh Corporation (×3 columns)
TSKgel guardcolumn SuperH-H manufactured by Tosoh Corporation (×1 column)
TSKgel SuperH-RC manufactured by Tosoh Corporation (×1 column)
Detector: RI detector
Standard polystyrenes: Standard polystyrene kit PStQuick C manufactured by Tosoh Corporation
Sample solution: 0.2 mass % tetrahydrofuran solution
Eluent: Tetrahydrofuran
Flow rate of eluent: 0.6 mL/min
Column temperature: 40° C.

Synthesis Example 1

12.5 g (66.4 mmol) of 5-phenyl-1,3-cyclohexanedione, 625 mg of phosphotungstic acid, 21.3 g (159 mmol) of trimethylolpropane, and 125 ml of toluene were placed in a 300 ml eggplant flask connected to a Dean-Stark apparatus with a condenser, and a stir bar was placed therein. The temperature was raised while stirring with a magnetic stirrer to allow acetal reaction under reflux of toluene for 2 hours while removing the generated water flowing out with the Dean-Stark apparatus roughly for a theoretical amount of water to be generated (132 mmol, 2.3 g). The reaction mixture was brought to room temperature, neutralized with 125 ml of an aqueous solution of saturated sodium bicarbonate, and then 125 ml of toluene was added to separate the mixture into aqueous and organic layers. The separated organic layer was washed with 125 ml of warm water at 40° C. The organic layer was set at 40° C. and 50 mml Ig to remove the solvent using an evaporator. The organic layer remaining (125 g) was stirred at room temperature and the crystals were removed. Toluene was used as the rinse solution to filter out the precipitated crystals. 16.0 g of the wet crystals were dried under the conditions of 5 mmHg and 100° C. to give 11.8 g (28 mmol) of 5-phenyl-1,3-cyclohexanedione trimethylolpropane diacetal (hereinafter referred to as "Compound 1") having a GC area of 99.6%. The melting point of the crystal was 135° C.

IR and $^1$H-NMR spectra of the obtained 5-phenyl-1,3-cyclohexanedione trimethylolpropane diacetal were measured to confirm that it was indeed 5-phenyl-1,3-cyclohexanedione trimethylolpropane diacetal based on the following characteristic peaks.

IR ($cm^{-1}$): 3365, 2965, 2948, 1474, 1463, 1358, 1263, 1253, 1191, 1162, 1087, 1061, 1031, 1000, 969, 820, 756, 699

$^1$H-NMR (500 MHz, ppm): 0.80 (t, 3H), 0.87 (t, 3H), 1.24 (m, 2H), 1.33 (m, 2H), 1.39 (t, 1H), 1.49 (d, 1H), 1.67 (t, 1H), 1.96 (d, 2H), 2.18 (d, 1H), 2.76 (d, 1H), 2.94 (m, 2H), 3.70 (m, 10H), 3.82 (m, 2H), 7.20 (m, 3H), 7.31 (m, 2H)

The peak around 7.26 ppm originated from heavy chloroform in the solvent.

LC analysis of Compound 1 showed that the LC area values of Isomers A and B represented by the structural formulas below were 26.6% and 73.1%, respectively, meaning that the isomer ratio was (Isomer A:Isomer B=27:73).

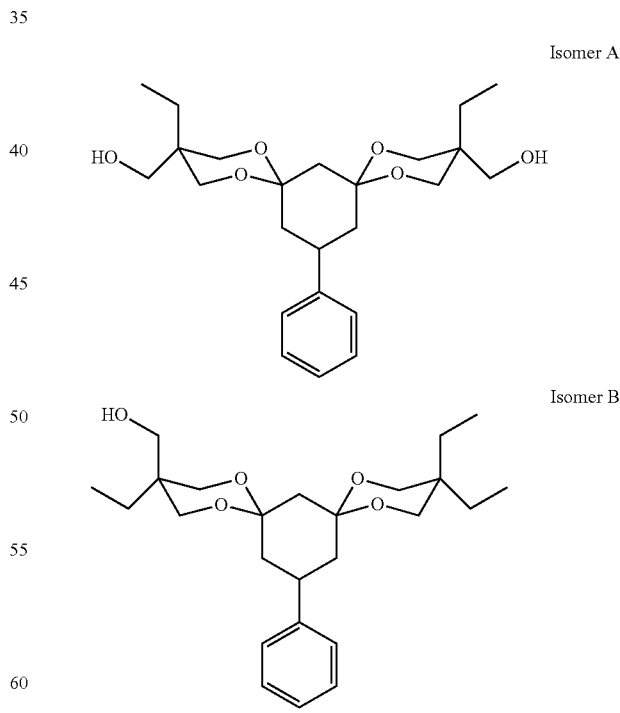

Synthesis Example 2

Compound 1 obtained in Synthesis example 1 was used to obtain Compound 2 by repeating recrystallization in the same manner as Synthesis example 1 until no area value for Isomer A was detected by LC analysis. LC analysis of Compound 2 showed that the LC area value of Isomer B was 97.0% and that of Isomer A was undetectable, meaning that the isomer ratio was (Isomer A:Isomer B=0:100).

Synthesis Example 3

42.8 g (264 mmol) of 4-t-butylbenzaldehyde and 396 ml of acetone were placed in a 1 L beaker, and 264 g of a 10 wt % aqueous solution of sodium hydroxide was added dropwise at a temperature of 30° C. or lower while stirring at room temperature. The mixture was then stirred at room temperature for 2.5 hours, neutralized with 44 g of acetic acid, and then acetone was distilled off.

264 ml of ethyl acetate was added to fractionate the organic phase. The resulting organic phase was washed sequentially with an aqueous solution of saturated sodium bicarbonate and an aqueous solution of saturated sodium chloride, and concentrated under reduced pressure to give 65.1 g of a light yellow liquid with a purity (GC area %) of 90.7%. The resulting reaction crude was subjected to simple distillation under reduced pressure at 141-145° C. and 0.1-0.2 kPa to give 35.4 g of a light yellow liquid with a purity (GC area %) of 98.8%.

30 ml of ethanol, 17.4 g (110 mmol) of diethyl malonate, and 37.4 g (110 mmol) of a 20 wt % sodium ethoxide ethanol solution were placed in a 500-ml four-necked flask equipped with a thermometer, nitrogen inlet tube, and condenser and stirred at room temperature for 30 minutes. The temperature was then raised to 70° C. and, continuously at that temperature, a solution of 20.2 g (100 mmol) of 4-t-butylbenzylideneacetone dissolved in 30 ml of ethanol was added dropwise over 25 minutes. Then, after addition of 80 ml of ethanol, the temperature was raised and the mixture was stirred under reflux for 2 hours.

Next, hydrolysis was carried out with a 10 wt % aqueous solution of sodium hydroxide under reflux for 2 hours, which was followed by distillation of 150 ml of ethanol under normal to reduced pressure. After cooling the mixture to room temperature, 80 g of a 20 wt % aqueous solution of hydrogen chloride was added, and decarboxylation reaction was carried out under reflux for 4 hours. The precipitated crystals were rinsed with 50 ml of water for four times and dried under reduced pressure to obtain 25.6 g of crude crystals with a GC purity of 91.3%. Subsequently, 200 ml of ethyl acetate was added, and the mixture was stirred at 70° C. for 1 hour. After rinsing the mixture with 50 ml of ethyl acetate to filter out the precipitated crystals, the mixture was dried under reduced pressure at 100° C. for 2 hours to give 19.7 g of a light-dark solid with a purity (GC area %) of 98.9%.

12.4 g (50 mmol) of 5-(4-t-butylphenyl)-1,3-cyclohexanedione, 16.8 g (125 mmol) of trimethylolpropane, 625 mg of phosphotungstic acid, and 120 ml of toluene were placed in a 500-ml four-neck flask equipped with a thermometer, nitrogen inlet tube, and condenser with a water separator and heated with stirring at reflux temperature for 2.5 hours. After the reaction was completed, the mixture was cooled to room temperature, 50 ml of an aqueous solution of saturated sodium bicarbonate was added, and the mixture was stirred for 0.5 hours. Thereafter, 50 ml of ethyl acetate was added, and the resulting organic phase was sequentially washed with warm water and concentrated under reduced pressure to give 23.5 g of diacetal crude. The obtained crude product was purified by recrystallization with 90 g of toluene, filtration/cake washing (40 ml of cold toluene), and drying under reduced pressure at 100° C. for 2 hours, thereby obtaining 14.8 g of 5-(4-t-butylphenyl)-1,3-cyclohexanedione trimethylolpropane diacetal (hereinafter, referred to as "Compound 3") with a purity (GC area %) of 98.5%.

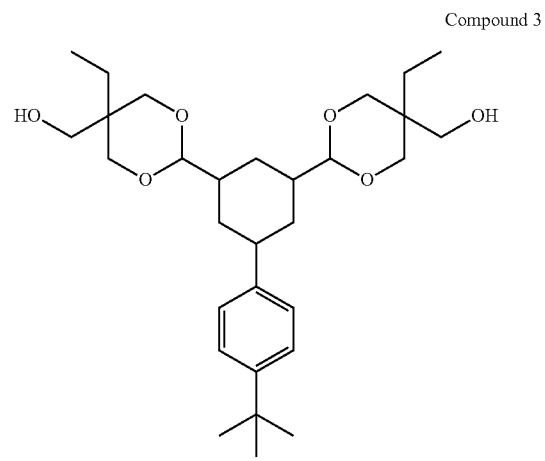 [SMILES: CCC1(CO)COC(C2CC(c3ccc(C(C)(C)C)cc3)CC(C3OCC(CC)(CO)CO3)C2)OC1]

Compound 3

Example 1

As raw materials, 23.5810 g (0.0538 mol) of 9,9-bis[4-(2-hydroxyethoxy)phenyl]fluorene (BPEF) represented by the following structural formula, 9.6899 g (0.0230 mol) of 5-phenyl-1,3-cyclohexanedione trimethylolpropane diacetal obtained in Synthesis example 1, 16.9474 g (0.0791 mol) of diphenylcarbonate (DPC), and $1.29071 \times 10^{-4}$ g ($1.53638 \times 10^{-6}$ mol) of sodium bicarbonate were placed in a 300-mL reactor equipped with a stirrer and distillation unit, and the system was set to 101.3 kPa nitrogen atmosphere. The reactor was immersed in an oil bath heated to 200° C. to initiate the transesterification reaction. Stirring was started 5 minutes after the start of the reaction, and after 20 minutes, the pressure was reduced from 101.3 kPa to 26.66 kPa over 10 minutes. The mixture was heated to a temperature of 210° C. while reducing pressure. 70 minutes after the start of the reaction, the temperature was raised to 220° C., and 80 minutes after the start of the reaction, the pressure was reduced to 20.00 kPa over 30 minutes. The temperature was raised to 240° C. while the pressure was reduced to 0.133 kPa, and held there for 10 minutes. Then, nitrogen gas was introduced into the reaction system to recover the pressure to 101.3 kPa, thereby obtaining a polycarbonate resin.

The resulting polycarbonate resin had a refractive index of 1.6076, an Abbe number of 27.46, a Tg of 144° C., and a polystyrene-equivalent weight-average molecular weight (Mw) of 37,000. The content of the diol compound, i.e., the raw material, and the physical properties of the resulting resin are shown in Table 1 below.

Example 2

A polycarbonate resin was obtained in the same manner as Example 1 except that 25.4506 g (0.0580 mol) of BPEF, 6.0881 g (0.0145 mol) of 5-phenyl-1,3-cyclohexanedione trimethylolpropane diacetal obtained in Synthesis example 2, 16.0044 g (0.0747 mol) of DPC, and $4.25154 \times 10^{-7}$ g ($3.65573 \times 10^{-5}$ mol) of sodium bicarbonate were used as raw materials.

The resulting polycarbonate resin had a refractive index of 1.6125, an Abbe number of 26.02, a Tg of 148° C., and a polystyrene-equivalent weight-average molecular weight (Mw) of 40,000. The content of the diol compound, i.e., the raw material, and the physical properties of the resulting resin are shown in Table 1 below.

Example 3

A polycarbonate resin was obtained in the same manner as Example 1 except that 23.3726 g (0.0533 mol) of BPEF, 6.5309 g (0.0129 mol) of 5-(4-t-butyl)-phenyl-1,3-cyclohexanedione trimethylolpropane diacetal obtained in Synthesis example 3, 14.6156 g (0.0682 mol) of DPC, and $4.25154 \times 10^{-7}$ g ($3.65573 \times 10^{-5}$ mol) of sodium bicarbonate were used as raw materials.

The resulting polycarbonate resin had a refractive index of 1.6119, an Abbe number of 26.35, a Tg of 146° C., and a polystyrene-equivalent weight-average molecular weight (Mw) of 37,000. The content of the diol compound, i.e., the raw material, and the physical properties of the resulting resin are shown in Table 1 below.

raw material, and the physical properties of the resulting resin are shown in Table 1 below.

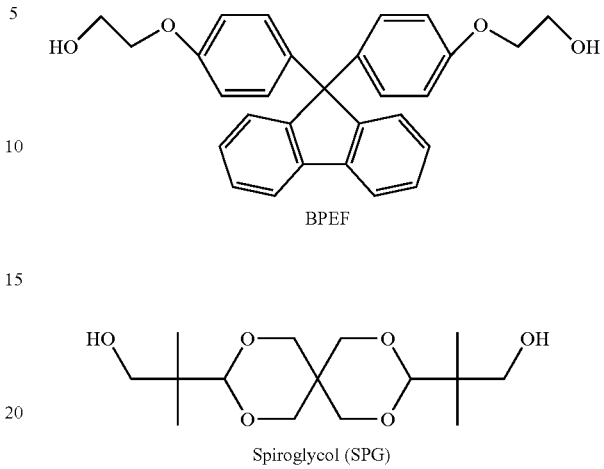

TABLE 1

| | Raw material (Diol compound) | | | | | | | |
|---|---|---|---|---|---|---|---|---|
| | Compound 1 (g) | Compound 2 (g) | Compound 3 (g) | BPEF (g) | SPG (g) | Compound 1 (mol) | Compound 2 (mol) | Compound 3 (mol) |
| Example 1 | 9.6899 | 0 | 0 | 23.5810 | 0 | 0.0230 | 0 | 0 |
| Example 2 | 0 | 6.0881 | 0 | 25.4506 | 0 | 0 | 0.0145 | 0 |
| Example 3 | 0 | 0 | 6.5309 | 23.3726 | 0 | 0 | 0 | 0.0129 |
| Comparative example 1 | 0 | 0 | 0 | 42.5953 | 12.6658 | 0 | 0 | 0 |

| | Raw material (Diol compound) | | | | Physical properties of polymer | | | |
|---|---|---|---|---|---|---|---|---|
| | BPEF (mol) | SPG (mol) | Compounds 1, 2, 3, and SPG (mol %) | Other than Compounds 1, 2, 3, and SPG (mol %) | nD | ν | Tg | Mw |
| Example 1 | 0.0538 | 0 | 30 | 70 | 1.6076 | 27.46 | 144 | 37,000 |
| Example 2 | 0.0580 | 0 | 20 | 80 | 1.6125 | 26.02 | 148 | 40,000 |
| Example 3 | 0.0533 | 0 | 20 | 80 | 1.6119 | 26.35 | 146 | 37,000 |
| Comparative example 1 | 0.0971 | 0.0416 | 30 | 70 | 1.5988 | 26.53 | 134 | 39,000 |

Comparative Example 1

A polycarbonate resin was in the same manner as Example 1 except that 42.5953 g (0.0971 mol) of BPEF, 12.6658 g (0.0416 mol) of spiroglycol (3,9-bis(1,1-dimethyl-2-hydroxyethyl)-2,4,8,10-tetraoxaspiro[5.5]undecane) (SPG) represented by the following structural formula, 30.6188 g (0.1429 mol) of DPC, and $1.1656 \times 10^{-4}$ g ($1.3874 \times 10^{-6}$ mol) of sodium bicarbonate were used as raw materials.

The resulting polycarbonate resin had a refractive index of 1.5998, an Abbe number of 26.53, a Tg of 134° C., and a polystyrene-equivalent weight-average molecular weight (Mw) of 39,000. The content of the diol compound, i.e., the As can be appreciated from the results shown in Table 1, Examples 1-3 using the novel cyclic diol compounds represented by General formula (1) had higher refractive index (nD) and higher glass transition temperature than those of Comparative Example 1 using spiroglycol, i.e., a conventional cyclic diol compound, showing that a resin with abundant aliphatic components which is excellent not only in optical properties but also in heat resistance can be obtained.

The invention claimed is:
1. A thermoplastic resin comprising a structural unit (A) derived from a monomer represented by General formula (1) below:

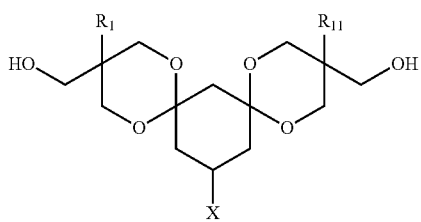
(1)

in General formula (1), $R_1$ and $R_{11}$ each independently represent a hydrogen atom, an aryl group with 6-12 carbon atoms, or a linear or branched alkyl group with 1-4 carbon atoms, and X represents any of General formulas (a) to (d) below:

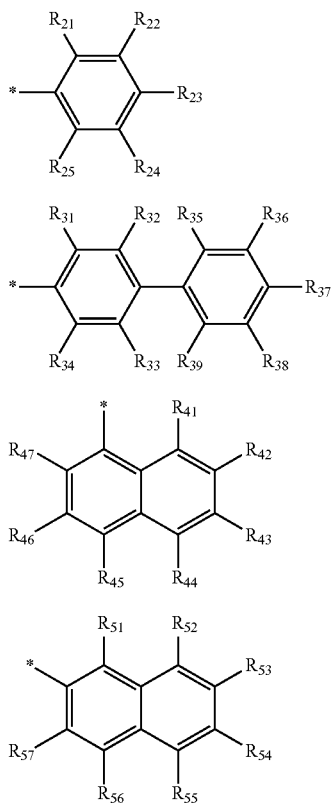

in General formulas (a) to (d), asterisks indicate binding sites, $R_{21}$-$R_{57}$ each independently represent a hydrogen atom, a fluorine atom, a chlorine atom, a bromine atom, a linear or branched alkyl group with 1-4 carbon atoms, or a linear or branched alkoxy group with 1-7 carbon atoms.

2. The thermoplastic resin according to claim 1, which is a polycarbonate resin or a polyester carbonate resin.

3. The thermoplastic resin according to claim 1, wherein $R_1$ and $R_{11}$ in General formula (1) above are each independently a linear or branched alkyl group with 1-4 carbon atoms.

4. The thermoplastic resin according to claim 1, wherein X in General formula (1) above is selected from the group consisting of a phenyl group, a biphenyl group, a 1-naphthyl group, and a 2-naphthyl group.

5. The thermoplastic resin according to claim 1, wherein the monomer represented by General formula (1) above consists of Isomer B represented by the following formula alone or a mixture of said Isomer B and Isomer A represented by the following formula:

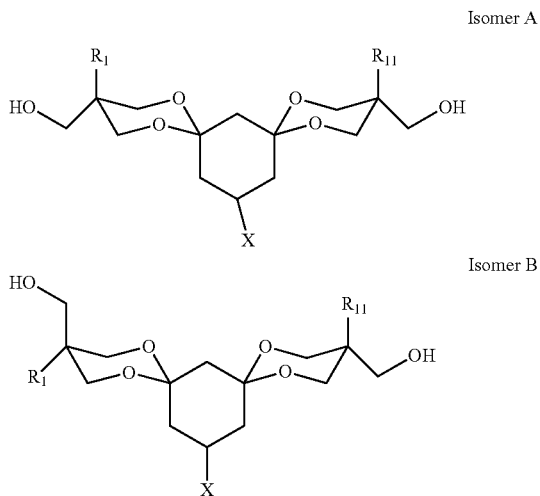

in the above formulas, $R_1$, $R_{11}$ and X are the same as those in General formula (1).

6. The thermoplastic resin according to claim 5, wherein the isomer ratio of Isomer A to Isomer B is A:B=0:100-99:1.

7. The thermoplastic resin according to claim 1, wherein the thermoplastic resin comprises a structural unit (B) derived from a monomer represented by General formula (2) below and/or a structural unit (C) derived from a monomer represented by General formula (3) below:

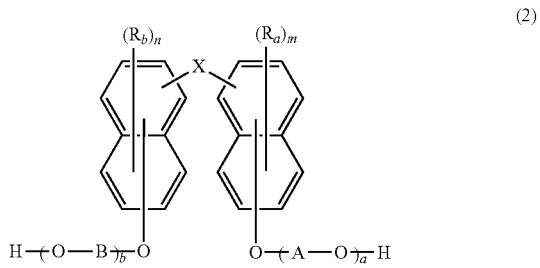
(2)

in General formula (2), $R_a$ and $R_b$ are each independently selected from the group consisting of a hydrogen atom, a halogen atom, an optionally substituted alkyl group with 1-20 carbon atoms, an optionally substituted alkoxyl group with 1-20 carbon atoms, an optionally substituted cycloalkyl group with 5-20 carbon atoms, an optionally substituted cycloalkoxyl group with 5-20 carbon atoms, an optionally substituted aryl group with 6-20 carbon atoms, an optionally substituted heteroaryl group with 6-20 carbon atoms containing one or more heteroatoms selected from O, N and S, an optionally substituted aryloxy group with 6-20 carbon atoms, and —C≡C—$R_h$, $R_h$ represents an optionally substituted aryl group with 6-20 carbon atoms or an optionally substituted heteroaryl group with 6-20 carbon atoms containing one or more heteroatoms selected from O, N and S, X represents a single bond or an optionally substituted fluorene group, A and B each independently represent an optionally substituted alkylene group with 1-5 carbon atoms, m and n each independently represent an integer from 0 to 6, and a and b each independently represent an integer from 0 to 10;

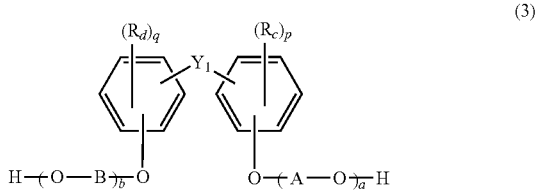

(3)

in General formula (3), $R_c$ and $R_d$ are each independently selected from the group consisting of a hydrogen atom, a halogen atom, an optionally substituted alkyl group with 1-20 carbon atoms, an optionally substituted alkoxyl group with 1-20 carbon atoms, an optionally substituted cycloalkyl group with 5-20 carbon atoms, an optionally substituted cycloalkoxyl group with 5-20 carbon atoms, and an optionally substituted aryl group with 6-20 carbon atoms, $Y_1$ is a single bond, an optionally substituted fluorene group, or any of the structural formulas represented by Formulas (4) to (10) below:

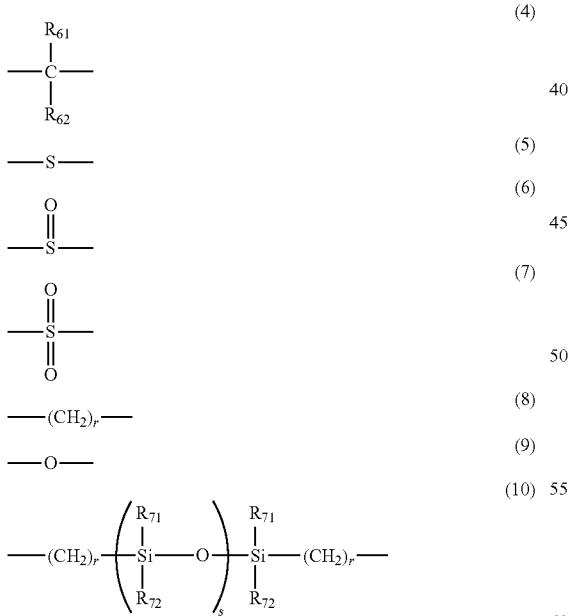

in Formulas (4) to (10), $R_{61}$, $R_{62}$, $R_{71}$ and $R_{72}$ each independently represent a hydrogen atom, a halogen atom, an optionally substituted alkyl group with 1-20 carbon atoms or an optionally substituted aryl group with 6-30 carbon atoms, or $R_{61}$ and $R_{62}$ or $R_{71}$ and $R_{72}$ are bonded to each other to form an optionally substituted carbon or heterocyclic ring with 1-20 carbon atoms, and r and s each independently represent an integer from 0 to 5,000, A and B each independently represent an optionally substituted alkylene group with 1-5 carbon atoms, p and q each independently represent an integer from 0 to 4, and a and b each independently represent an integer from 0 to 10.

8. The thermoplastic resin according to claim 7, wherein, in General formulas (2) and (3) above, A and B each independently represent an alkylene group with 2 or 3 carbon atoms.

9. The thermoplastic resin according to claim 7, wherein the thermoplastic resin contains at least a structural unit derived from any of BPEF, BNE, BNEF, and DPBHBNA.

10. The thermoplastic resin according to claim 1, wherein the thermoplastic resin further contains a structural unit derived from at least one monomer selected from the following group of monomers:

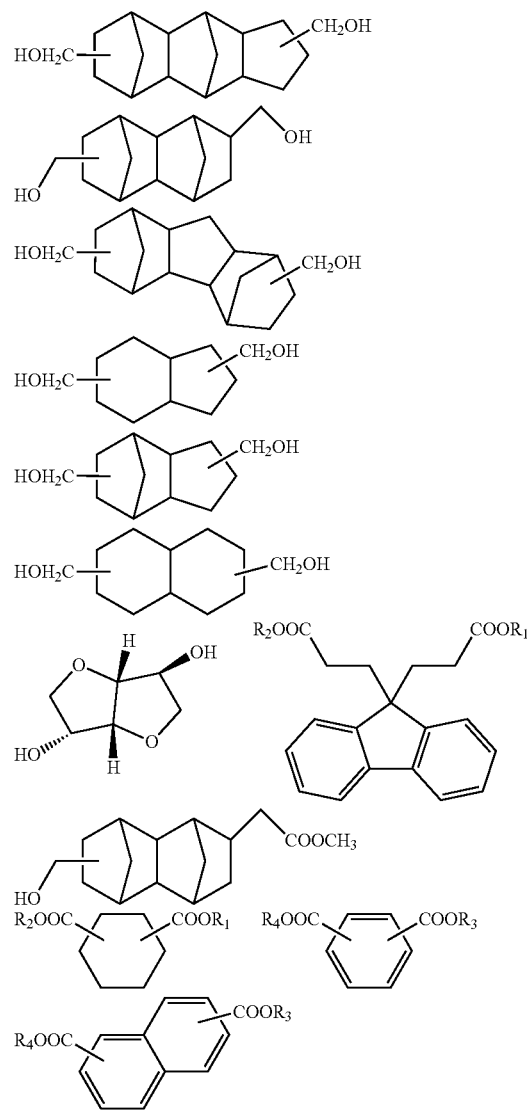

-continued

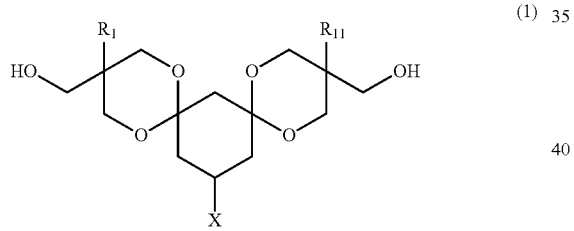

in the above formulas, $R_1$ and $R_2$ each independently represent a hydrogen atom, a methyl group or an ethyl group, and $R_3$ and $R_4$ each independently represent a hydrogen atom, a methyl group, an ethyl group or an alkylene glycol with 2-5 carbon atoms.

11. The thermoplastic resin according to claim 1, wherein the weight-average molecular weight (Mw) of the thermoplastic resin in terms of polystyrene equivalent is 10,000-200,000.

12. The thermoplastic resin according to claim 1, wherein the refractive index (nD) of the thermoplastic resin is 1.599-1.750.

13. The thermoplastic resin according to claim 1, wherein the Abbe number (v) of the thermoplastic resin is 25.0-33.0.

14. The thermoplastic resin according to claim 1, wherein the glass transition temperature of the thermoplastic resin is 135-200° C.

15. A thermoplastic resin composition comprising a modifier represented by General formula (1) below and a thermoplastic resin:

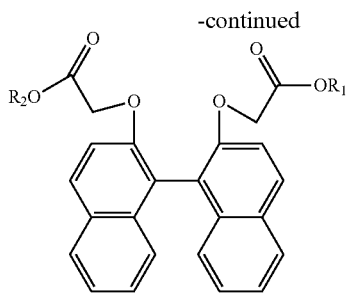
(1)

in General formula (1), $R_1$ and $R_{11}$ each independently represent a hydrogen atom, an aryl group with 6-12 carbon atoms, or a linear or branched alkyl group with 1-4 carbon atoms, and X represents any of General formulas (a) to (d) below:

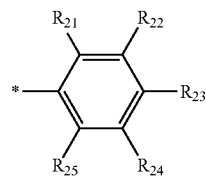
(a)

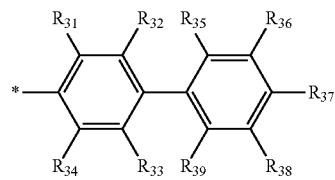
(b)

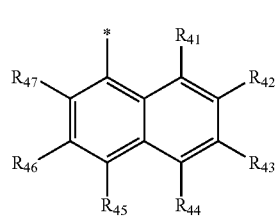
(c)

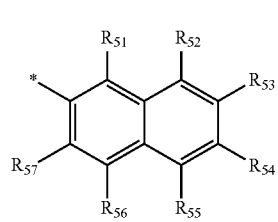
(d)

in General formulas (a) to (d), $R_{21}$-$R_{57}$ each independently represent a hydrogen atom, a fluorine atom, a chlorine atom, a bromine atom, a linear or branched alkyl group with 1-4 carbon atoms, or a linear or branched alkoxy group with 1-7 carbon atoms.

16. An optical component comprising the thermoplastic resin according to claim 1.

17. An optical lens comprising the thermoplastic resin according to claim 1.

18. An optical film comprising the thermoplastic resin according to claim 1.

* * * * *